Dec. 1, 1953  F. L. BIDINGER  2,661,217
RECORD PLAYING DEVICE
Filed Dec. 3, 1947  12 Sheets-Sheet 1
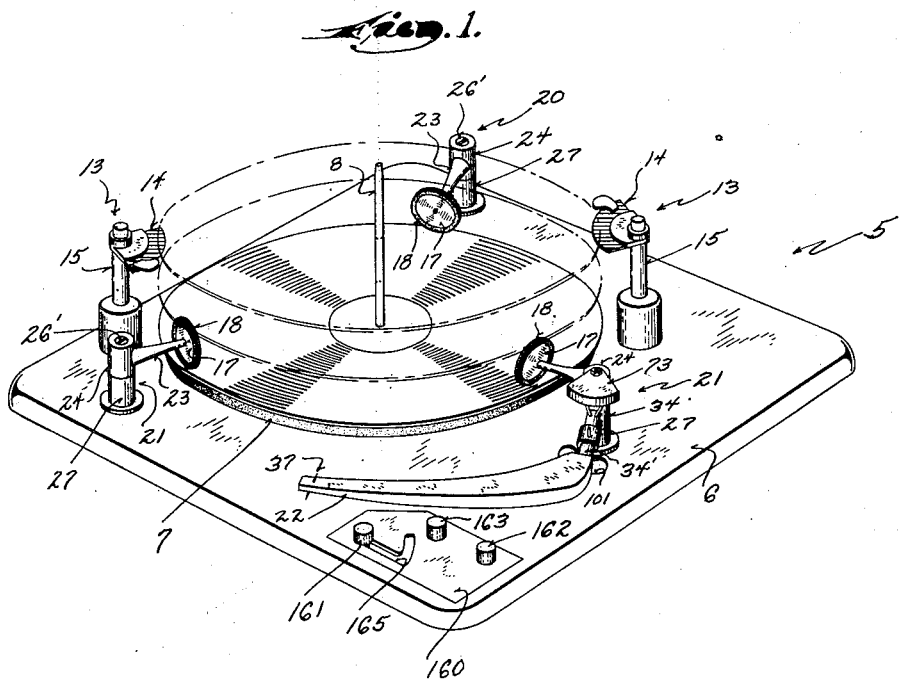
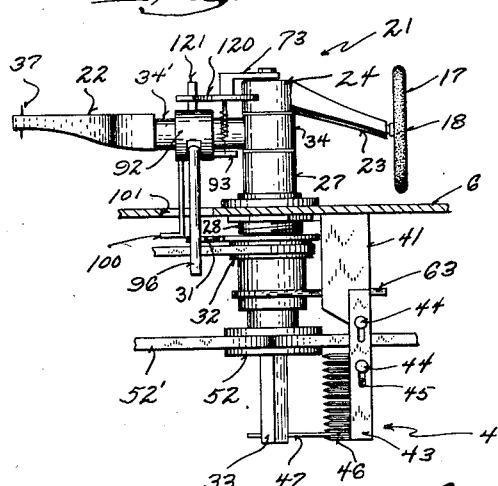
Franz L. Bidinger Dec. 1, 1953   F. L. BIDINGER   2,661,217
RECORD PLAYING DEVICE
Filed Dec. 3, 1947   12 Sheets-Sheet 2

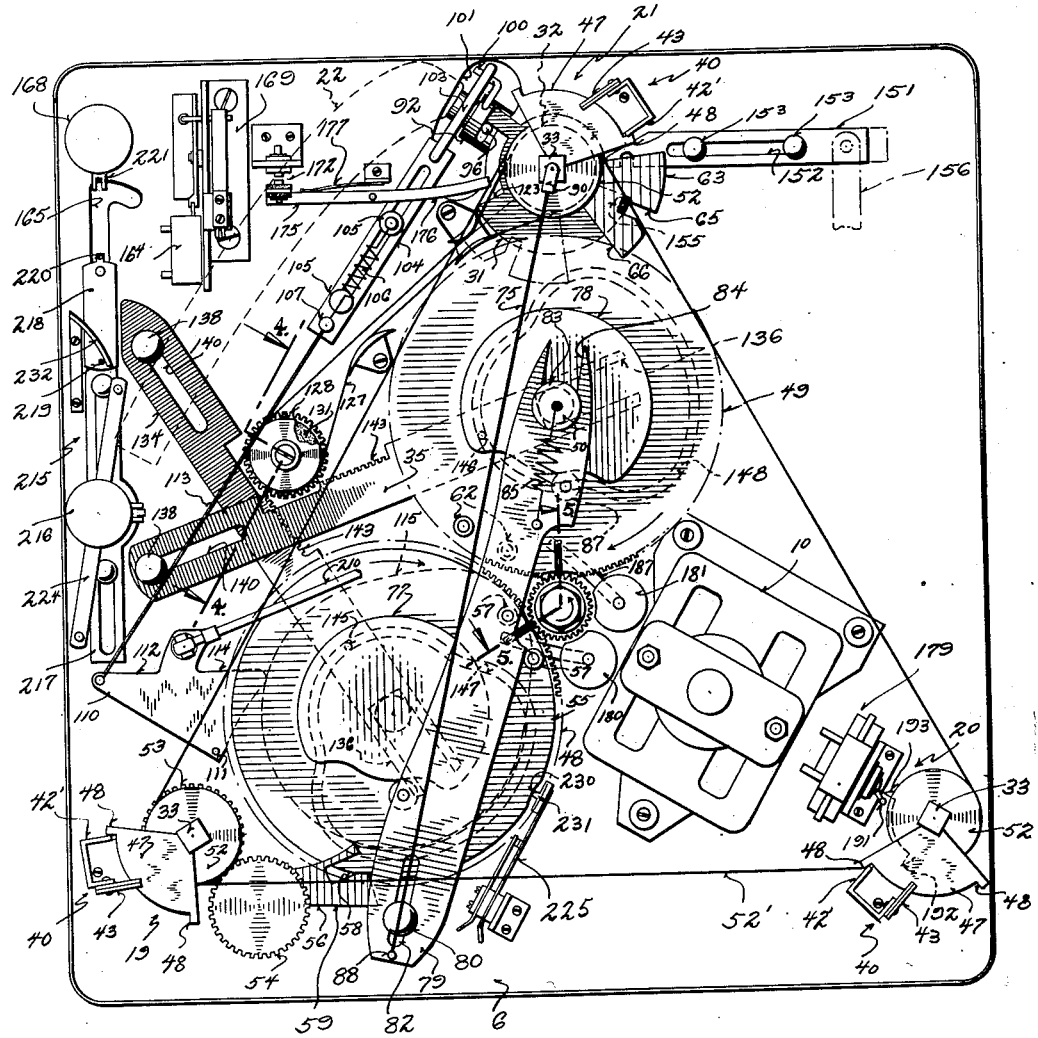

Dec. 1, 1953  F. L. BIDINGER  2,661,217
RECORD PLAYING DEVICE
Filed Dec. 3, 1947  12 Sheets-Sheet 4
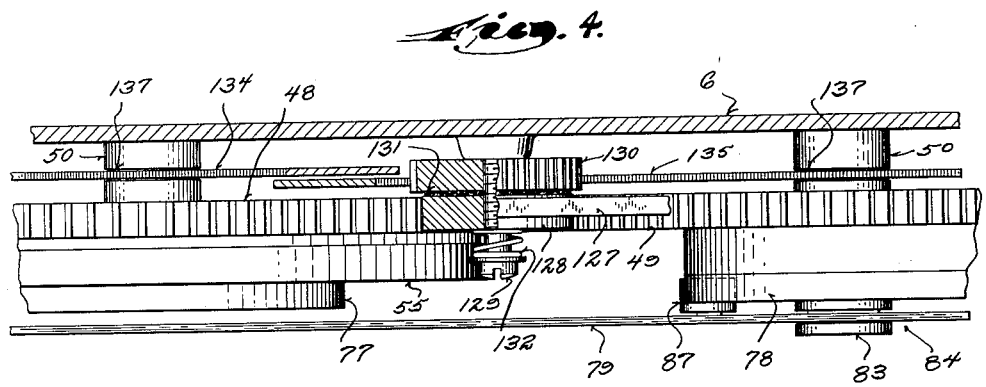
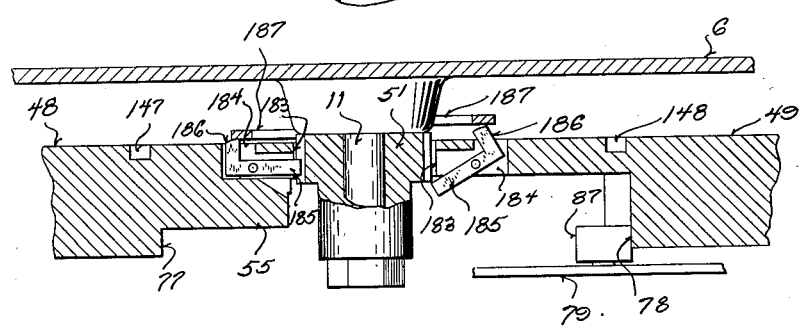
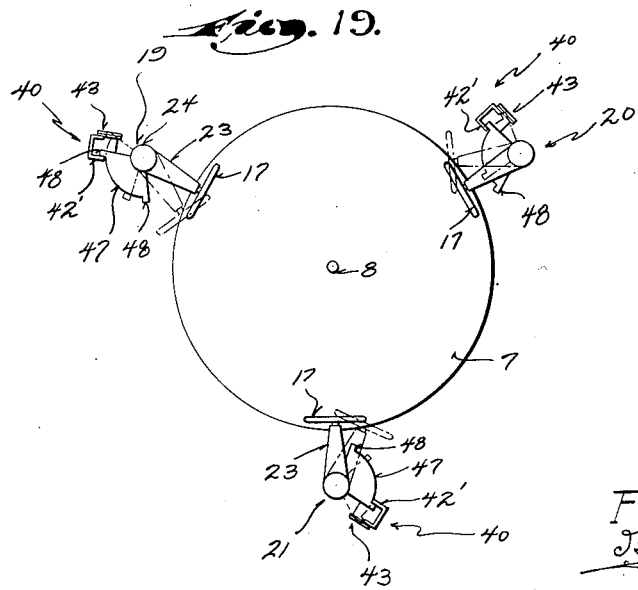
Inventor
Franz L. Bidinger

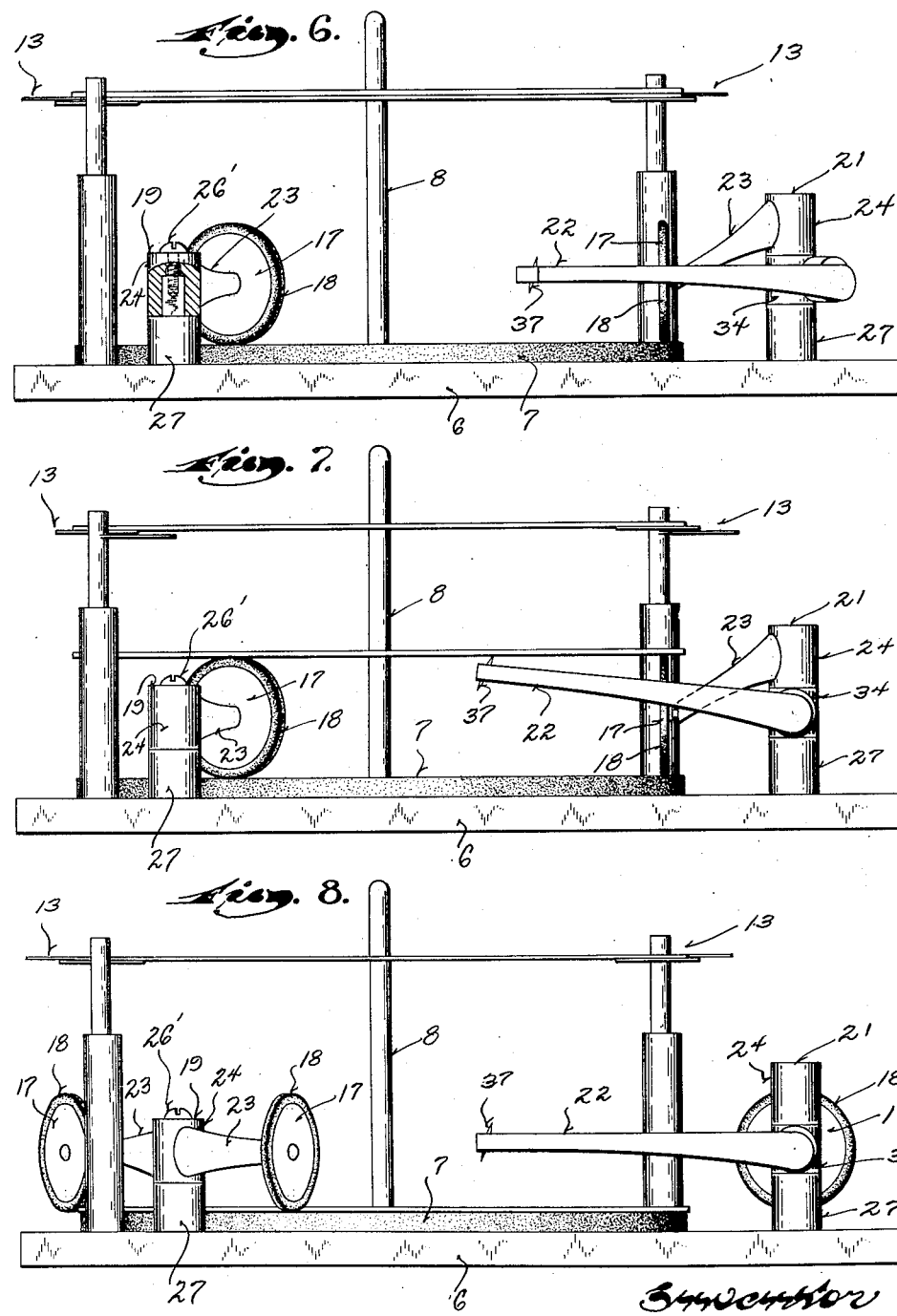

Dec. 1, 1953   F. L. BIDINGER   2,661,217
RECORD PLAYING DEVICE
Filed Dec. 3, 1947   12 Sheets-Sheet 6
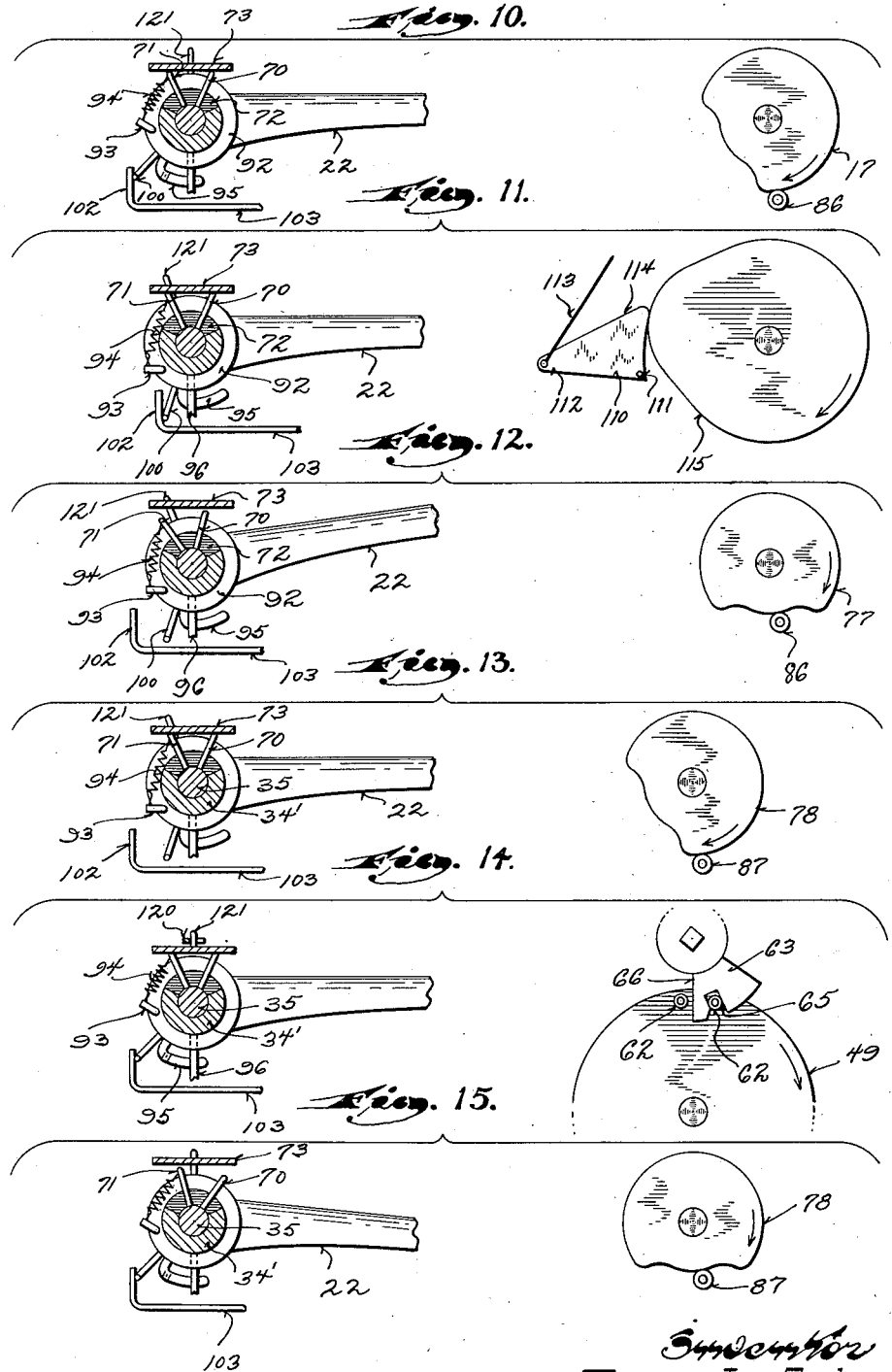

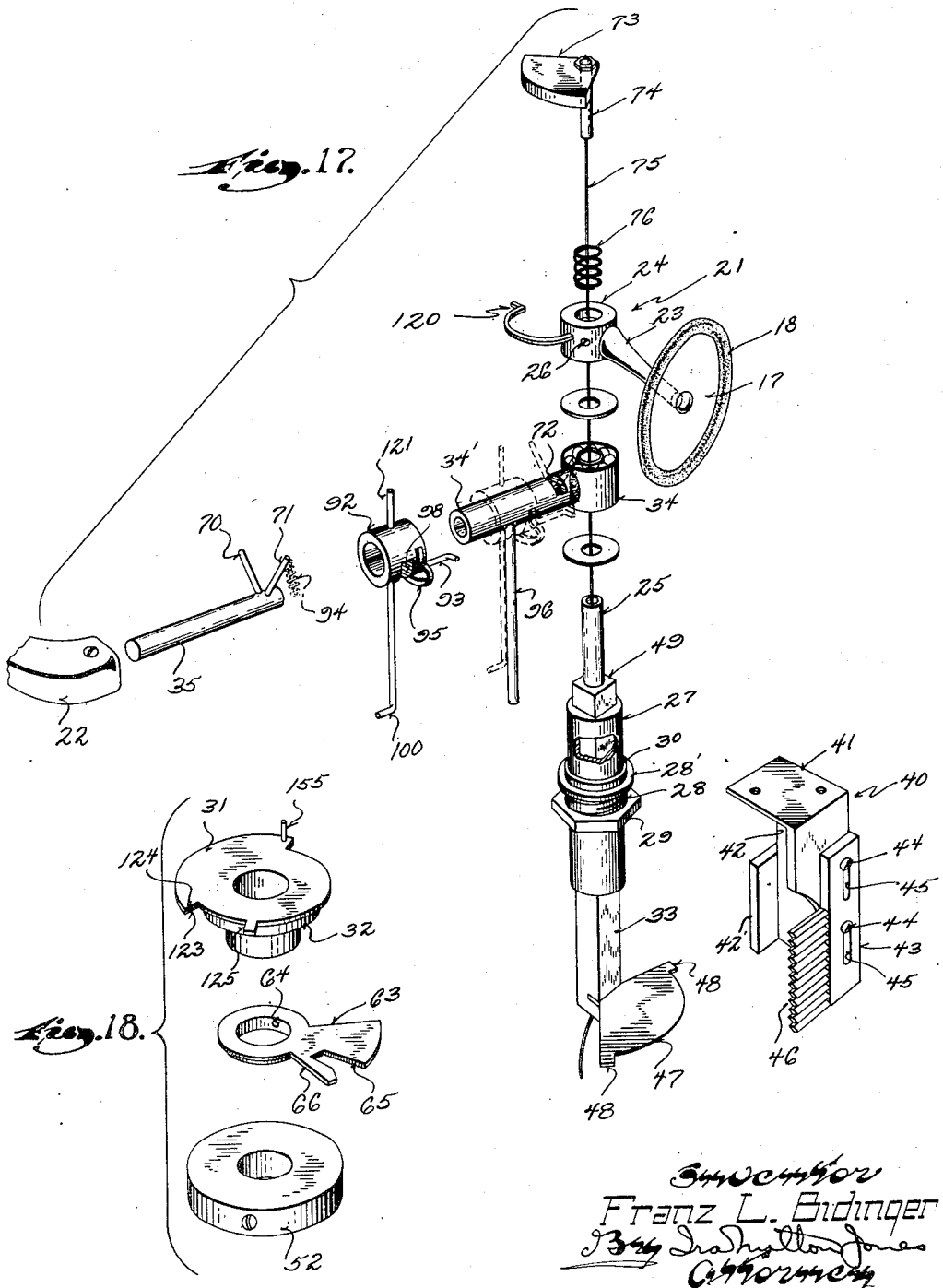

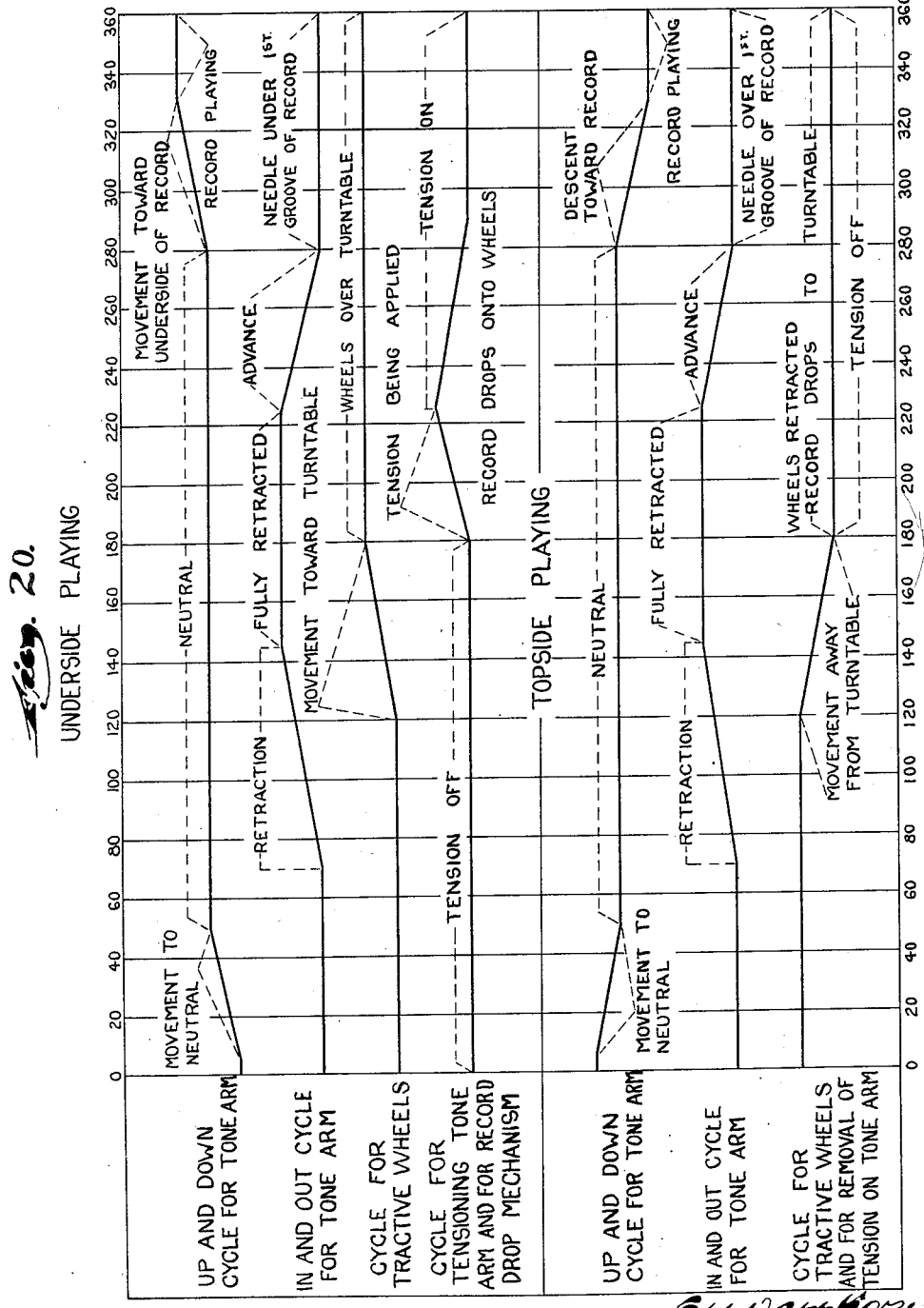

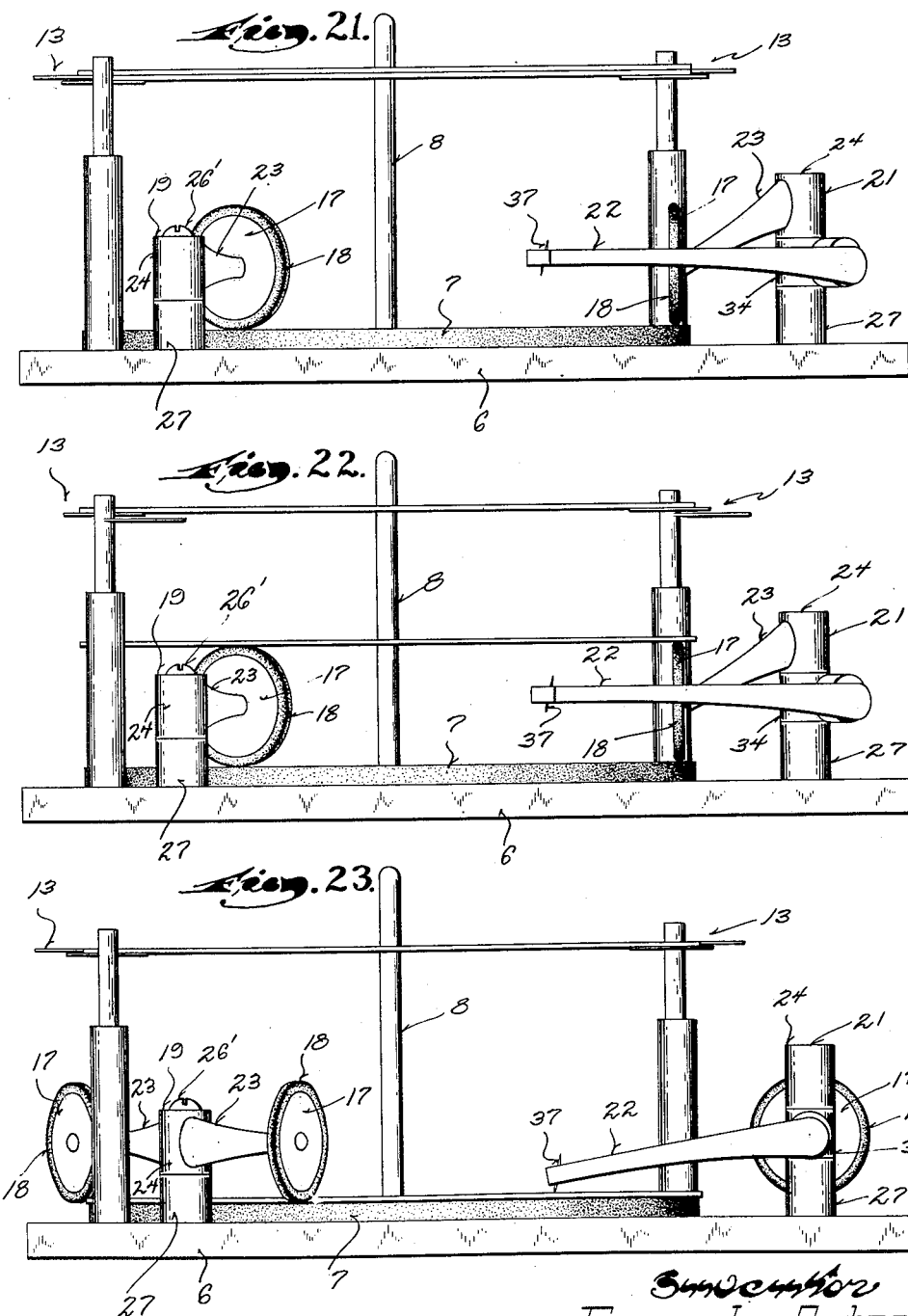

Dec. 1, 1953
F. L. BIDINGER
2,661,217
RECORD PLAYING DEVICE
Filed Dec. 3, 1947
12 Sheets-Sheet 10
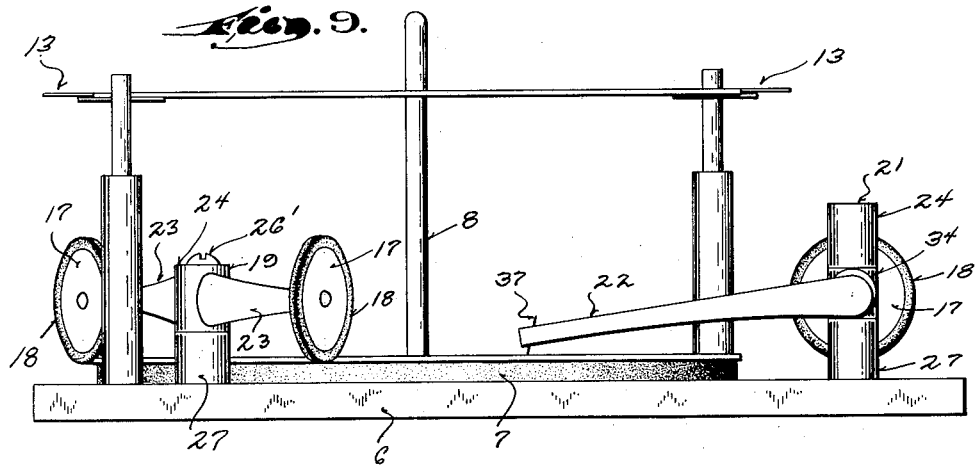
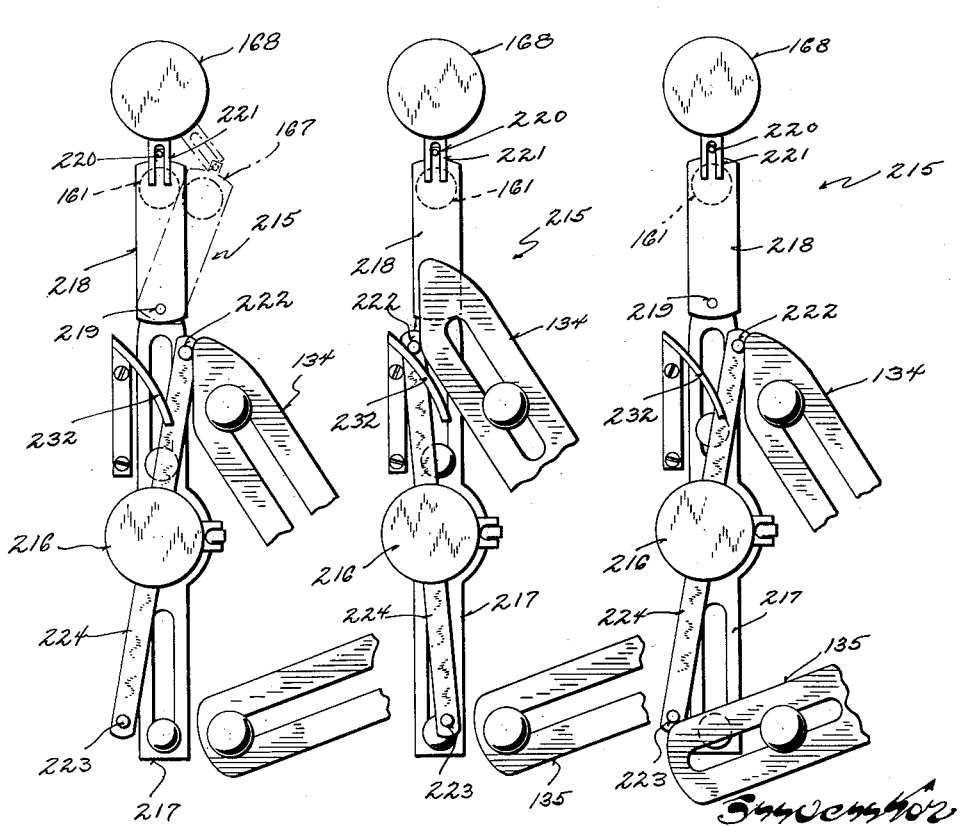

Dec. 1, 1953   F. L. BIDINGER   2,661,217
RECORD PLAYING DEVICE
Filed Dec. 3, 1947   12 Sheets-Sheet 11
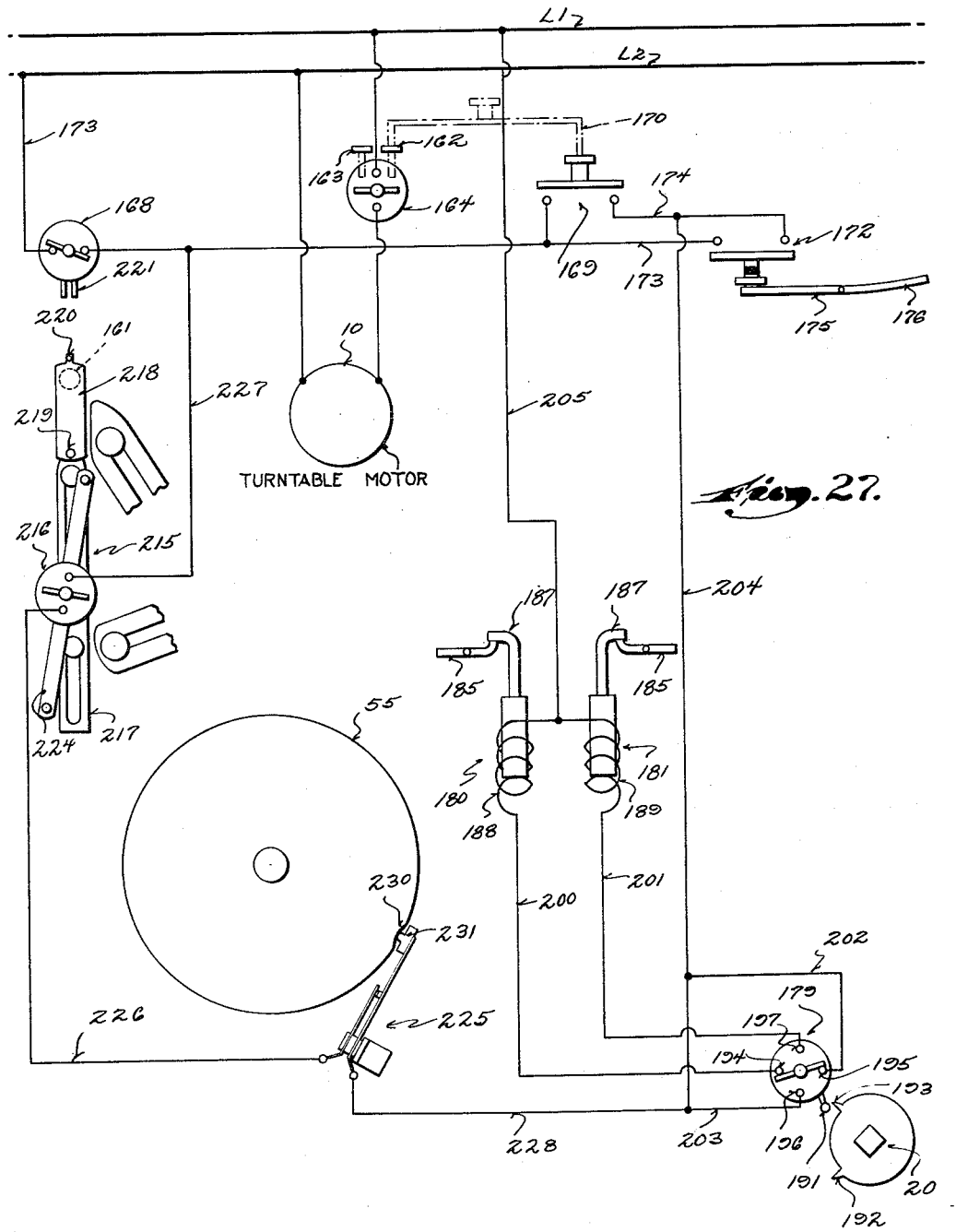

Dec. 1, 1953
F. L. BIDINGER
2,661,217
RECORD PLAYING DEVICE
Filed Dec. 3, 1947
12 Sheets-Sheet 12
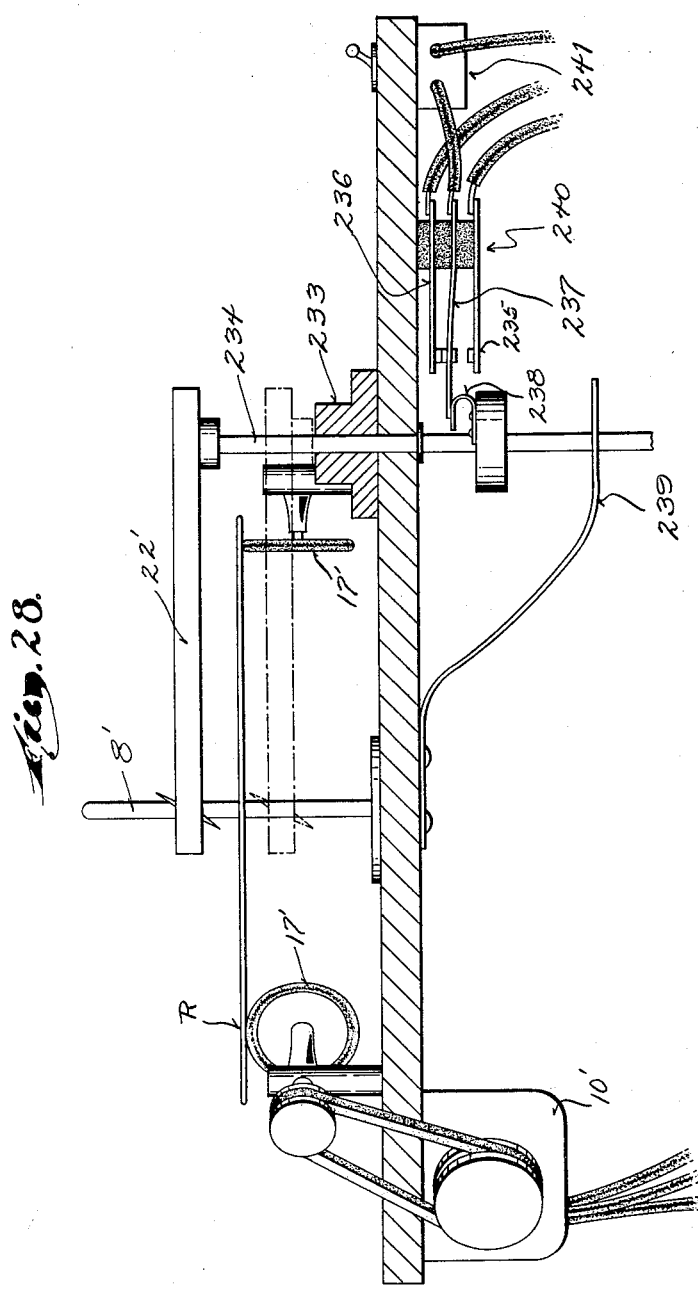
Inventor
Franz L. Bidinger
By Ira Hutton Jones
Attorneys Patented Dec. 1, 1953

2,661,217

UNITED STATES PATENT OFFICE 2,661,217

RECORD PLAYING DEVICE

Franz L. Bidinger, Kenosha, Wis.

Application December 3, 1947, Serial No. 789,436

1 Claim. (Cl. 274—10)

This invention relates to record playing devices and has more particular reference to improvements in disc record players.

In general this invention has as its object the provision of improved means for supporting and rotating disc records during playing of the records.

More specifically it is an object of this invention to provide a record player by which both sides of disc records may be played automatically and in succession by means of simple but efficient mechanism occupying but a minimum of space.

Another object of this invention resides in the provision of novel disc record supporting mechanism embodying a number of wheels operable to rotate the records for playing thereof without requiring the conventional record turntable but which may be employed together with the turntable to greatly facilitate and simplify the playing of both sides of a disc record.

A further object of this invention resides in the provision of an automatic record player embodying a number of traction wheels for supporting and rotating disc records during playing thereof, and in the provision of operating mechanism cooperable with record dropping means to automatically govern the playing of both sides of records dropped by the dropping mechanism.

Still another object of this invention resides in the provision of improved mechanism for handling and playing disc records by which abuse of the records is held to a minimum.

Still another object of this invention resides in the provision of a compact automatic record playing device by which both sides of a disc record may be played in succession, and which may be set to operate for the automatic playing of one side of records or the playing of single records manually.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate two complete examples of the physical embodiment of the invention constructed according to the best modes so far devised for the practical application of the principles thereof, and in which:

Figure 1 is a perspective view of an automatic record playing device embodying the principles of this invention;

Figure 3 is a view looking at the underside of the record player shown in Figure 2;

Figure 4 is a sectional view taken through Figure 3 along the line 4—4;

Figure 5 is a detail sectional view taken through Figure 3 along the line 5—5;

Figures 6, 7, 8 and 9 are more or less diagrammatic side elevational views illustrating the manner in which the record supporting wheels are employed during the automatic and successive playing of both sides of a disc record;

Figures 10, 11, 12, 13, 14 and 15 are a succession of views diagrammatically illustrating the mechanism for controlling the movements of the pickup arm of the player;

Figure 16 is a sectional view taken through Figure 1 on the plane of the line 16—16;

Figure 17 is an exploded perspective view of a portion of the structure illustrated in Figure 16;

Figure 18 is an exploded perspective view of another portion of the structure shown in Figure 16;

Figure 19 is a plan view diagrammatically illustrating the mechanism for controlling the elevation of the record supporting wheels during the transfer of a record therefrom to the turntable;

Figure 20 is a chart showing the sequence of operation of the various instrumentalities of the record player of this invention;

Figures 21, 22 and 23 are side elevational views similar to Figures 6 to 9 inclusive but showing the manner in which the topsides of records may be automatically played by the record playing device of this invention;

Figures 24, 25 and 26 are fragmentary views illustrating a portion of the selector intrumentalities by which the record playing device of this invention may be set for the automatic playing of one side of disc records, and by which the device may be set to automatically play both sides of records in succession or to enable playing of one side of records manually;

Figure 27 is an electrical diagram showing the electrical control system for the record playing device of this invention; and Figure 28 is a diagrammatical view illustrating a modified embodiment of this invention.

Figure 2:
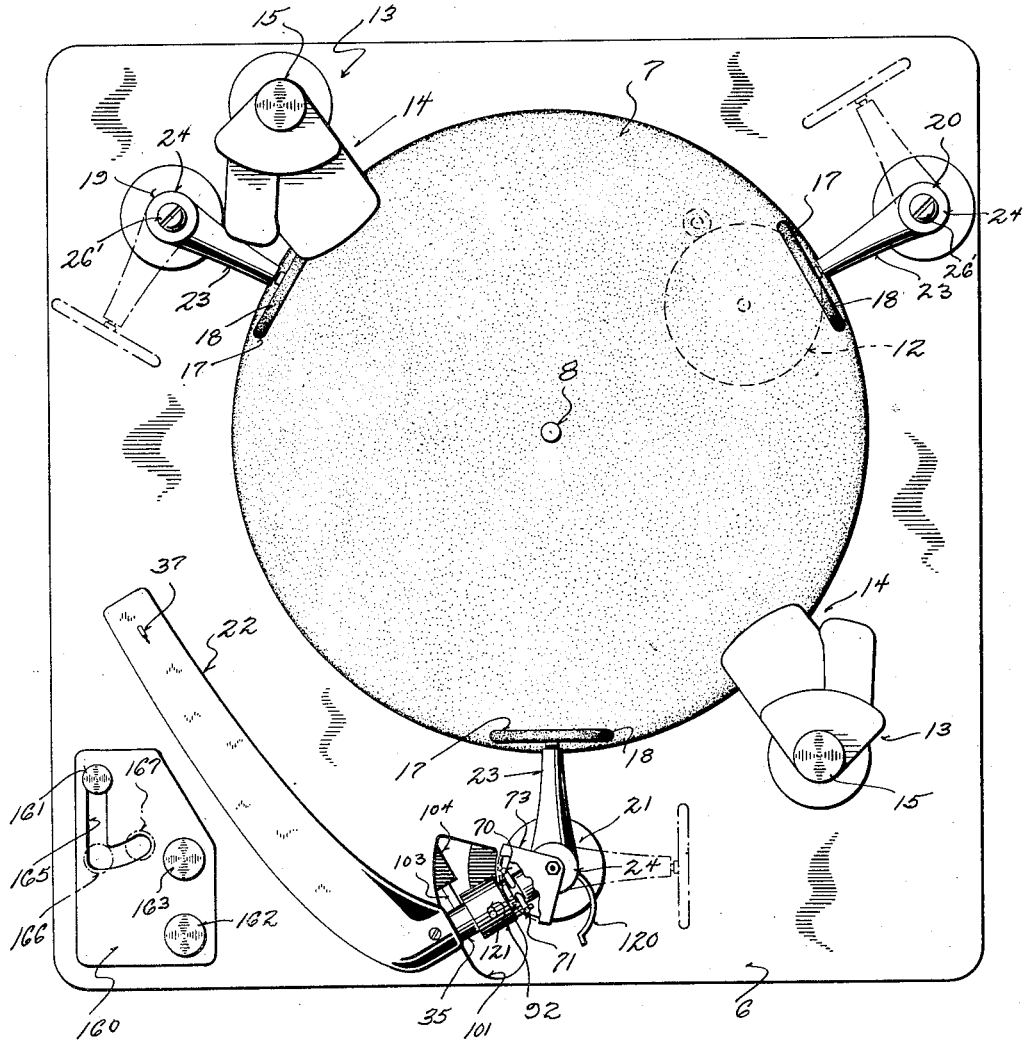
Figure 2 is a plan view of the device shown in Figure 1.

Referring now more particularly to the accompanying drawings in which like numerals designate like parts, the numeral 5 generally designates the record player of this invention. The player has a base plate 6 which provides for mounting the device in a cabinet and serves to support the operating mechanism at the underside thereof. A turntable 7 of more or less conventional design is rotatably journalled on the base plate at the topside thereof to support and rotate records for the playing of the topsides of such records, and has the usual upright record spindle 8 projecting therefrom to hold the records on the turntable for rotation in a horizontal plane and on a fixed vertical axis.

The turntable is adapted to be driven by an electric motor 10 secured to the underside of the base plate and drivingly connected with a friction wheel 12 beneath the turntable and tracking on the inside of a rim around the periphery of the table in a more or less conventional manner as indicated in Figure 2 so as to impart rotation to the turntable in a clockwise direction on the axis of the spindle shaft 11.

As shown best in Figures 1 and 2, the record playing device of this invention is provided with automatic record dropping mechanism 13. This dropping mechanism may be of any conventional design, but for purposes of illustration has been shown as comprising sets of diametrically opposite leaves or blades 14 mounted from upright posts 15 alongside the periphery of the turntable for swinging motion in a horizontal plane. As is well known, these blades are adapted to hold a stack of records to be played a distance above the turntable, and when swung outwardly in unison on their posts 15 in the proper direction (counterclockwise as seen in Figure 2) release the bottom record of the stack for descent toward the turntable. While not shown, it is to be understood that suitable and conventional mechanism is provided at the underside of the base plate for swinging the blades in unison on their posts.

Ordinarily, release of the bottom record of a stack supported by the blades of the record dropping mechanism 13 results in the released record dropping down the spindle 8 and onto the turntable for the playing of the topside of the record thereon. According to the present invention, however, the record thus released by the dropping mechanism is adapted to be received on the peripheries of a number of traction wheels 17 interposed edgewise between the turntable and the stack of records held by the dropping mechanism. Hence, a record dropped onto the wheels is supported thereby at a level intermediate the bottom of the stack held by the dropping mechanism and the turntable, and at a height above the turntable corresponding to the diameter of the wheels 17.

Inasmuch as the wheels 17 have a rim of yieldable material 18 such as rubber or an equivalent material having a high coefficient of friction, the descent of the record released by the dropping mechanism is cushioned upon contact with the wheels so as to prevent damage to the record.

As shown best in Figures 1 and 2, there are preferably three traction wheels 17 provided for the support of a record at an elevation above the turntable, and these wheels are supported from posts 19, 20, and 21 located at equispaced points about the periphery of the turntable, and all rotatable on vertical axes. The posts 19 and 20 are identical and are preferably located near the back edge of the base plate, as seen in Figure 2, while the post 21 comprises a master control post and also provides a swinging support for the pickup arm 22 of the player.

Each of the wheels 17 is journalled for free rotation on a horizontal axis and is carried at the outer end of an arm 23 of a length such as to dispose the wheels over the turntable or any records resting thereon when the arms are disposed radially of the spindle 8. A hub 24 on the inner end of each arm provides for mounting the same on its post. The hub of the arm received on the master post 21 is fixed to a turned down stem 25 on the upper end of this post as by means of a set screw 26; while the hubs of the arms received on the posts 19 and 20 have square wells opening to their undersides (see Figure 6) to receive the square upper ends of the posts. Screws 26' passing through the hubs and threading into the upper extremities of the latter two posts serve to anchor the hubs to the posts.

Inasmuch as all of the posts are otherwise similar, only the master post 21 has been shown in detail, and as best seen in Figures 16 and 17 the master post comprises a quill or tube 27 rotatably received in a bushing 28 fixed in a suitable aperture (not shown) in the base plate with the plate clamped between a flange 28' on the upper end of the bushing and a nut 29 threaded onto the lower portion of the bushing. An annular shoulder 30 on the tube at its intermediate portion seats on the flange 28' of the bushing and cooperates with the flange 31 of a pulley 32 rotatably received on the lower extremity of the tube just beneath the bushing to hold the quill or tube 27 against up and down motion in the bushing.

A square shaft 33, integral with the stem 25 in the case of the master post, is slidably but nonrotatably received inside each tube 27 to turn therewith but to be movable up and down relative to the tube to enable vertical adjustment of the wheel thereon relative to the turntable. The hub 24 of the wheel supported by the master post occupies the upper portion of the stem 25, and a second hub 34 is freely rotatably received on the stem 25 beneath the wheel hub. The hub 34 has a tubular arm 34' fixed to and projecting laterally therefrom substantially at right angles to the post, and a rock shaft 35 projecting at right angles from the inner end of the pickup arm is rotatably received in said tubular arm 34' so that the pickup arm is supported therefrom for up and down pivotal or rocking motion on the horizontal axis of the arm 34' and for bodily swinging motion about the stem 25 in a substantially horizontal plane.

It will be apparent, therefore, that the wheels 17 are freely rotatable on horizontal axes and are supported from their respective posts for bodily swinging motion about vertical axes adjacent to the periphery of the turntable; and that when the wheels are swung inwardly over the turntable to positions tracking on the turntable and with their axes of rotation normal to and intersecting the axis of the spindle 8, they are capable of supporting a record on their peripheries in spaced superimposed relationship to the turntable and with the underside of the record accessible for playing. Also, when the wheels are swung on their respective posts to an inoperative position rolled off of the turntable, as indicated in construction lines in Figure 2, they effect transfer of a record from their peripheries to the turntable for the playing of the topside of said record.

It is important to note that the pickup arm 22, when in a horizontal position, aligns with the space between the turntable and a record supported on the peripheries of the wheels 17, and the arm may be readily swung horizontally into and out of said space to enable the playing of the underside of a record on the wheels or the topside of a record transferred from the wheels to the turntable.

In the present instance the outer end of the pickup arm is provided with the usual pickup cartridge (not shown) and has a record engaging stylus 37 which projects both upwardly and downwardly so as to be engageable either with the underside of a record supported on the wheels upon upward tilting of the pickup arm or to be engaged with a record on the turntable upon downward tilting of the pickup arm.

Inasmuch as the wheels 17 are supported from their square shafts 33 for up and down motion, it follows that the wheels are free to ride up and onto a record transferred to the turntable from the peripheries of the wheels. Because of the fact the played records accumulate on the turntable however, it is desirable to maintain the wheels at a predetermined elevation with respect to the topmost record on the turntable each time the wheels are swung off the turntable to effect transfer of a record thereto, so that it is merely necessary for the wheels to climb up and onto the last record transferred to the turntable.

For this purpose wheel supporting structures 40 are provided, one for each of the wheel supporting shafts 33. The wheel supporting structures 40 are fixed to the underside of the base plate, one alongside each of the wheel posts, and each such supporting structure includes an attaching portion 41 engaged flatwise with and secured to the underside of the base plate, and a flange 42 depending vertically therefrom and turned substantially edgewise to the axis of its adjacent post. A comb 43 is connected flatwise to one side of the flange 42 by means of vertically spaced pins 44 anchored in the flange and received in substantially short vertically extending slots 45 in the bar.

By reason of this connection the comb is enabled to slide upwardly a limited distance, and to drop down to a position determined by the engagement of the pins 44 with the upper extremities of the slots 45. Comb teeth 46 project outwardly from one edge of each comb toward the adjacent post, and the spacing of these teeth corresponds to the average thickness of disc records.

Cooperating with the combs are sector-like plates or flanges 47, one fixed to the bottom portion of each shaft 33 so as to be rotatable edgewise therewith and to be movable up and down with its shaft 33. These plates are so related to the comb teeth that upon retraction of the wheels from the turntable or the top most record resting thereon, the plates 47 simultaneously enter one of the spaces between two adjacent teeth on the bottom portions of the combs adjacent thereto. Hence the lowermost of the two adjacent teeth of the combs thus engaged support the entire wheel assemblies through the plates resting thereon during the entire time the wheels are off the turntable.

Since the spaces between the comb teeth on each bank thereof are arranged to align with and receive the plates 47 therebetween at each successively higher operating level of the wheels on the turntable during the automatic playing of a stack of records, it follows that the comb teeth support the wheel assemblies in predetermined elevational relationship to the topmost of the records accumulating on the turntable, or in other words with the peripheries of the wheels at the underside thereof in substantially tangential relationship to the top of the last played record on the turntable. Hence, when the wheels are brought back over the turntable, they automatically lift themselves up and onto the last transferred record on the turntable to "ride" freely thereon without interference from the combs.

Referring to Figure 19 it will be seen that during swinging motion of the wheels toward their operative record supporting positions, the plates 47 all become disengaged from their respective comb teeth just prior to the time the wheels reach their operative positions tracking on the topmost record of the stack, or upon the turntable itself, so that the wheels may rest on the turntable or said topmost record thereon under the bias of the weight of the wheel assemblies to thereby establish a good frictional driving connection between the wheels and the turntable.

The supporting structures 40 also are designed to provide rotational stops for the wheels 17 to limit the same to bodily swinging motion on the vertical axes of their posts through an arc of no more than 90°. For this purpose each of the structures 40 is provided with a vertical flange 42' parallel to the flange 42 but spaced therefrom at the side of the latter facing the turntable. Abutments 48 on the arcuate extremities of each of the sector-like plates 47 cooperate with the flange 42' to limit the wheels to 90° of swinging motion between their operative and inoperative positions; and it will be noted that while one of the abutments of each plate engages the flange 42' when the wheels are supported by their respective combs, the other of the abutments engages the flange 42' at the time the wheels are properly tracking on the turntable or the topmost record of the turntable, and at which time the plates 47 are entirely disengaged from the teeth of the combs.

It is also essential that the pickup arm 22 be adjusted to successively higher levels during the playing of a stack of records, and in the present instance the pickup arm is caused to rise to such successively higher elevations along with the wheels 17. This is brought about by reason of the fact that the hub 34 of the pickup arm rests on the shoulder 49 at the junction between the square shaft 33 and the reduced stem 25 of the master post, so that the wheel on the master post in effect lifts the pickup arm during its travel onto the last transferred record on the turntable, and thus holds the arm at the proper elevation at which it is capable of playing either the underside of a record supported on the wheels or the topside of a record on the turntable.

The control mechanism for automatically governing the playing of both sides of records includes instrumentalities operated by sets of cams carried by each of a pair of main gears 48 and 49 at the underside of the base plate. These gears are supported by stub shafts 50 for rotation on vertical axes, and it will be noted that the gear 48 lies substantially midway between the spindle shaft 11 and the wheel post 19, while the gear 49 is substantially midway between the spindle shaft and the master post 21; and that the peripheries of the gears are in juxtaposition to the teeth of a drive pinion 51 on the spindle shaft.

In the interests of clarity, the separate mechanisms for actuating the wheels, and the pickup arm, and the electrical control system and selecting means for governing the automatic operation of such actuating mechanism will be described separately in the following.

Wheel actuating mechanism

All of the wheel actuating mechanism is located beneath the base plate, and this mechanism includes a pulley 52 fixed to the lower extremity of each of the tubes 27 for the shafts 33, and a band 52' trained about said pulleys to connect the wheel posts together for rotation in unison.

When the wheels 17 are in their inoperative positions rolled off the turntable, as is the case in Figure 3, they are adapted to be advanced in unison through an arc of 90° onto the turntable by rotation of a nearly circular cam disc 55 fixed to the main gear 48. This is accomplished by a pair of rollers 57 carried by the cam 55 at its underside and freely rotatable on circumferentially spaced axes fixed with relation to the cam and parallel to the axis of the gear 48. During rotation of the cam, these rollers are adapted to be successively engaged with a lever arm 56 pivotally carried by the base plate to cause rotation of a gear 54 fixed on the lever arm and such rotation of the gear 54 is translated into rotation of all the wheel posts, in a counterclockwise direction as seen in Figure 2, through a gear 53 fixed on the post 19 and meshing with the gear 54.

The gears 53 and 54 are of the same size and in order to assure 90° of rotation of the gears, the lever arm has a slot 58 in its outer edge into which the leading roller 57 rides to effect swinging of the wheels part way toward the turntable, with swinging motion of the wheels to their operative record supporting positions being completed by the engagement of the trailing roller 57 with the trailing edge 59 of the lever arm.

While the mechanism just described is operable to effect swinging of the wheels in unison through an arc of 90° from their inoperative record transferring positions to their operative record receiving positions over the turntable, other means must be employed to roll the wheels off the turntable to their inoperative positions to effect the transfer of a record from the peripheries of the wheels to the turntable. This latter mechanism includes a pair of rollers 62 on the underside of the gear 49 rotatable on circumferentially spaced axes parallel to the axis of rotation of the gear, and these rollers are adapted to be successively engaged with a lever arm 63 fixed on the lower portion of the tube 27 of the master post as by means of a set screw 64.

The lever arm 63 has a substantially flat sector-like shape as seen best in Figures 3 and 18 and projects flatwise beneath the gear 49 when the wheels 17 are in their operative positions over the turntable to lie in the path of the rollers 62. Hence, upon rotation of the gear 49 in a clockwise direction (as viewed in Figure 3) the leading roller 62 is adapted to ride into a slot 65 in the outer edge of the lever and swing the lever in a counterclockwise direction (Figure 3) part way to the full line position shown, to carry all the wheels part way off the turntable. The remainder of the arcuate swinging motion of the wheels to their inoperative position is completed by the trailing roller 62 engaging the trailing edge 66 of the arm 63.

During such swinging of the wheels in unison to their inoperative positions, or in other words during the time the wheels are being rolled off the turntable, it will be seen by reference to Figure 19 that the plates 47 on all of the posts engage the teeth on the combs 43 to support the wheels against dropping downwardly by gravity, and that upon actuation of the gear 54 by the rollers 57 to roll the wheels back onto the turntable or the last transferred record thereon, the plates 47 are disengaged from the teeth of the combs 43 just prior to the time the wheels reach their operative positions with their axes of rotation normal to the spindle axis.

Actuating means for pickup arm

As stated previously, the pickup arm, is supported by the master post 21 both for horizontal swinging motion back and forth over the turntable or into the space between the turntable and a record supported on the wheels, and for tilting motion about the axis of the horizontal rock shaft 35 to enable the stylus at the outer end of the arm to be engaged either with the underside of a record on the wheels or with the topside of a record on the turntable.

According to the present invention, it is a prerequisite to horizontal swinging motion of the pickup arm that the arm be moved to a "neutral" position prior to swinging motion of the arm back and forth over the turntable. The mechanism for bringing the pickup arm to a "neutral" position substantially centrally of the space between the turntable and a record supported on the wheels 17 includes a pair of angularly disposed radial pins 70 and 71 of equal length fixed to the spindle rock shaft 35 and projecting upwardly therefrom through an arcuate slot 72 in the tubular shaft 34' in which the spindle shaft is oscillatably received, the pins and the slot 72 being located close to the hub 34 of the pickup arm. These pins diverge outwardly toward their free ends and are adapted to be engaged by a leveling cap 73 mounted on the top of the master post 21 for up and down motion relative thereto by means of a hollow sleeve 74 fixed to the underside of the cap. The entire shaft 33 of the master post is hollow, and the sleeve 74 on the cap is slidably received inside the stem 25 of the master post to have a flexible wire or cord 75 pass upwardly through the post to be anchored to the leveling cap.

Thus, the cap 73 is mounted from the stem 25 of the master post in a position above the hub 24 of the master post wheel, and a compression spring 76 is confined between the wheel hub and the underside of the cap to bias the cap upwardly away from engagement with the free extremities of the radial pins 70 and 71.

When the pickup arm is in either of its tilted positions such as shown in Figures 12 and 15, it is only necessary to draw the cap 73 downwardly against the force of the spring 76 onto the most nearly vertical of the radial pins to effect rocking of the spindle shaft 35 and "centering" or neutralizing of the pickup arm; and it will be obvious that this "neutral" position is determined by engagement of the free extremities of both the pins 70 and 71 with the underside of the cap 73 as shown in Figures 10, 11, 13 and 14.

The leveling cap 73 is drawn downwardly onto the radial pins 70 and 71 to effect neutralization of the pickup arm by exerting a downward pull on the cable or wire 75, and identical cams 77 and 78 fixed to rotate with the gears 48 and 49 respectively are provided to effect such a pull on the cable. These cams are adapted to act upon a common horizontal bar 79 therebeneath constrained to endwise sliding motion substantially toward and from the master post 21. One end of the bar 79 is supported for such endwise sliding motion by means of a headed stud 80 fixed to and projecting down from the base plate, and engaged in an elongated slot 82 in the end of the bar remote from the master post. The opposite end of the bar 79 is forked as at 84 and embraces the lower extremity of the shaft of the gear 49, a head 83 on the shaft engaging the underside of the bar 79 to support the same.

A tension spring 85 connected between the bar 79 and the shaft of the gear 49 at all times exerts a yielding force on the bar tending to slide the same endwise toward the master post and thus to relieve tension on the cable 75 of the leveling cap. Motion of the bar toward the master post, of course, is limited by engagement of the bottom of the fork forming slot 84 with the side of the gear shaft.

The bar 79 carries a pair of cam follower rollers 86 and 87 at the topside thereof for engagement with the peripheries of the cams 77 and 78 respectively and against which the followers are held under a degree of spring tension by means of the spring 85.

The cams 77 and 78 are so designed and so angularly related to one another that initial rotation of either of the cam discs 77 or 78 with the main gears 48 or 49 respectively, effects endwise sliding motion of the horizontal bar 79 away from the master post against the tension of the spring 85. Since the cable or flexible wire 75 is attached to the bar 79 as at 88, it follows that such endwise sliding of the bar away from the master post draws the leveling cap 73 down onto the radial pins 70 and 71 to effect neutralization of the pickup arm in the manner hereinbefore described.

Inasmuch as the flexible cable 75 makes a relatively sharp turn at the bottom of the master post it is preferably led through an elbow-like fitting 89, the function of which is to assure smooth sliding of the cable and to minimize wear thereon at said turn.

For the playing of the topside of a record on the turntable, the weight of the pickup arm holds the stylus at the outer end of the arm engaged with the record under the proper degree of bias, but for the playing of the underside of a record supported on and rotated by the wheels 17, it is essential that the pickup arm be biased to an upwardly tilted position with a force slightly greater than the weight of the arm, but the force of the arm against the underside of the record should obviously be less than the weight of the record supported on the wheels.

For this purpose a biasing collar 92 is mounted upon the tubular arm 34' of the pickup for free rotation thereon. This collar has a pin 93 projecting longitudinally from its inner end toward the master post to lie beneath the pin 71 on the rock shaft 35 of the arm. The pin 93 provides an anchor for one end of a tension spring 94, the opposite end of the spring being connected to the pin 71 near the outer extremity of the latter.

In the neutral or horizontal condition of the pickup arm, the disposition of the pin 71 is such as to relieve the spring 94 of its tension. Likewise, in the downwardly tilted condition of the pickup arm shown in Figure 15, the spring 94 is practically free of tension.

Tension is applied onto the pin 71 in a direction to exert an upward tilting component upon the pickup arm, however, by rotation of the tensioning collar 92 in a direction such as to tend to separate the spring anchor 93 on the collar from the radial pin 71 on the rock shaft 35, and with the leveling cap in its raised position the force of the spring 94 is sufficient to hold the pickup arm in its upward tilted condition as diagrammatically seen in Figure 12 for the playing of the underside of a record supported on and rotated by the wheels 17.

The tension necessary for the playing of the underside of such a record is maintained by the engagement of a detent part 95 on the tensioning collar with a downwardly depending pin 96 fixed on the tubular arm 34' of the pickup, the detents being shown in their operative collar retaining positions in Figures 11, 12 and 13. It is important to note that the pin 96 projects through an arcuate slot 98 in the tensioning collar to anchor the collar against endwise sliding on the tubular arm 34' without interfering with the required degree of rotation of the collar relative to the tubular arm.

The tensioning collar 92 is rotated in a counterclockwise direction to its operative tensioning position seen in Figures 11, 12, and 13 at which the cooperating detent parts engage with one another to maintain the spring 94 stretched, by means of a hook 100 fixed to the collar and projecting downwardly therefrom through an aperture 101 in the base plate to have its hooked extremity lie in the path of the upturned end 102 of an actuator 103 fixed to a slide bar 104. The slide bar 104 is mounted flatwise against the underside of the base plate by means of spaced studs 105 engaged in a longitudinal slot in the slide bar and which constrain the slide to endwise motion in a substantially horizontal plane toward and from the lower extremity of the hook 100 when the pickup arm is in an inoperative position swung outwardly away from the turntable. A spring 106 connected to one of the studs 105 and with the slide bar as at 107 tends to draw the slide bar toward the extremity of the hook 100 in which direction motion of the slide is limited by the engagement of the other of the studs with the adjacent end of the slot in the bar.

The slide bar 104 is moved endwise away from the rocking axis of the pickup arm by means of a lever 110 overlying the cam disc 55 and carried by a pivot 111 fixed to the underside of the base plate with the pivot axis of the lever spaced a short distance outwardly from the periphery of the cam disc 55 and substantially close to the wheel post 19. One arm 112 of the lever is connected by means of a flexible cable 113 with the slide bar 104 so that swinging of the lever in a counterclockwise direction as viewed in Figure 3 draws the slide bar away from the rocking axis of the pickup arm against the tension of the spring 106.

A second arm 114 of the lever projects between the gear 48 and the cam disc 55 to have its outer end engaged under the action of the spring 106 with the periphery of a cam 115 fixed to the gear 48 to rotate therewith. Hence, the outer end of the lever arm 114 acts as a cam follower by which the cam 115 produces rocking of the lever back and forth upon its pivot 111 to effect drawing of the slide in one direction and the release of the slide for spring propelled motion in the opposite direction.

As stated previously the tensioning collar 92 is rotated to its tension applying position capable of holding the pickup arm in an upwardly tilted position by such endwise sliding motion of the slide 104 in consequence to swinging of the lever 110 in a counterclockwise direction. The tensioning collar 92 is adapted to be rotated in a clockwise direction as viewed in Figures 10 to 15 inclusive to disengage the same from the detent mechanism and thereby effect removal of the tension on the pickup arm by means of an arm 120 fixed on the hub 24 of the wheel on the master post brought into engagement with an upstanding pin 121 on the tensioning collar during swinging motion of the wheels to carry the same off the turntable or the topmost of the records accumulated thereon.

Horizontal swinging motion of the pickup arm about the vertical axis of the master post 21 while the arm is in a neutral position is accomplished by rotation of the pulley 32 which is rotatably received upon the lower end of the tubular mount 27 of the master post between the lower end of the bushing 28 and the lever 63.

For this purpose the pulley flange 31 has an arcuate notch 123 in its edge, the extremities of which are defined by substantially radially disposed shoulders 124 and 125. The pin 96 which is carried by the tubular arm 34' of the pickup arm projects downwardly through the opening 101 in the base plate and into the notch 123 so as to lie in the path of either one of the shoulders 124 and 125 during oscillatory motion of the pulley 32.

Hence, with the pickup arm in a position such as it would occupy at the completion of playing a record, that is, close to the spindle 8, rotation of the pulley in a clockwise direction from its position seen in Figure 3 engages the shoulder 124 of the pulley with the pin 96 on the arm to swing the pickup arm outwardly to its retracted position (shown in Figure 3) away from the turntable; while rotation of the pulley in a counterclockwise direction is adapted to bring the shoulder 125 on the pulley against the pin 96 and to return the pickup arm the comparatively short distance necessary to vertically align the stylus on the pickup arm with the peripheral edge portions of records on the wheels 17 or on the turntable.

The pulley 32 is rotated by means of a belt or band 127 trained about it and a second pulley 128 mounted on a stud 129 projecting from the underside of the base plate for rotation on a vertical axis. The pulley 128 is drivingly connected through a friction clutch 131 with a pinion 130, likewise rotatably mounted on the stud 129 at the topside of the pulley. The efficacy of the clutch is controlled by a spring 132 confined between the head of the stud and the pulley 128 and may be regulated by turning the stud into or out of the base plate to adjust the force of the spring. The purpose of the friction clutch is to enable manual swinging of the pickup arm regardless of its position relative to the turntable.

Rotation is adapted to be imparted to the drive pulley 128 and the gear 130 connected therewith by either one of two rack bars 134 and 135 operatively associated with the gears 48 and 49 respectively. Each of the bars has a bifurcated inner end 136 embracing a reduced portion 137 of the shaft for its respective main gear, and headed pins 138 passing through elongated slots 140 in the opposite ends of the bars cooperate with the gear shafts to mount the bars for endwise sliding motion in a crossed condition.

Each of the rack bars has teeth 143 on the edge thereof adjacent to the gear 130 which are normally disengaged from the gear but are brought into mesh with the gear upon endwise sliding motion of the bars outwardly of the main gears 48 and 49.

Such sliding motion is transmitted to the rack bars to effect rotation of the gear 130 by means of cam followers 145 and 146, on the bars 134 and 135 respectively, engaged in cam tracks 147 and 148 formed in the topsides of the main gears 48 and 49 respectively.

The angular disposition of these cam tracks in relation to one another is such that rotation of either of the gears 48 or 49 through an arc of approximately 90° from their positions shown in Figure 3 is necessary before endwise outward sliding motion of the rack bars commences; and such that rotation of both said gears through an arc of about 270° is required to return the rack bars to their positions shown in Figure 3.

Hence, it will be apparent that during one complete revolution of either of the gears 48 or 49, one of the rack bars will be first propelled outwardly to swing the pickup arm away from the turntable, and subsequently will be moved inwardly to effect swinging motion of the pickup arm to a position in line with the outer periphery of the records to be played.

Attention is directed to the fact that the pickup arm must be swung outwardly away from the spindle axis a similar distance regardless of whether a 10" or a 12" record is being played, but the extent of inward swinging motion of the pickup arm must be automatically controlled for alignment of the stylus either with the peripheral portion of a 10" record or the peripheral portion of a 12" record to be played.

One manner in which such control of inward swinging motion of the pickup arm may be effected has been shown more or less diagrammatically in Figure 3, and this mechanism comprises a bar 151 having a central elongated slot 152 to receive the shanks of headed pins 153 spaced apart a distance less than the length of the slot and nearly in line with the axis of the master post 21. The pins 153 thus provide for limited endwise sliding motion of the bar 151 toward and from the master post.

In the position of the bar shown, a notch 154 in the side edge of the bar facing the main gear 49 aligns arcuately with a pin 155 carried by the flange 31 of the pulley 32, and the engagement of the pin in the bottom of the notch 154 determines the extent of inward swinging motion of the pickup arm toward the spindle axis for the playing of 10" records. When the bar is slid to the right of its Figure 3 position, the unnotched side edge of the bar is engaged by the pin 155 during swinging of the pickup arm inwardly toward the spindle axis to limit such swinging motion of the arm at a point where the stylus of the arm substantially aligns with the peripheral edge portions of 12" records.

The bar 151 is adapted to be actuated by the record dropping mechanism so that upon setting of the posts for the support of a stack of 10" records on the blades of the mechanism, the bar 151 will be carried to its limit of motion shown in Figure 3. Likewise swinging of the posts 15 of of the dropping mechanism to their positions at which 12" records may be supported upon the blades of the mechanism causes the bar 151 to be moved to its opposite extremity of motion to limit the inward travel of the pickup arm at a point where its stylus aligns with the peripheral edge portions of 12" records. A lever 156 adapted to interconnect the bar 151 with the dropping mechanism at the underside of the base plate is provided for this purpose.

Electrical control instrumentalities

Referring to Figures 2, 3, and 27, it will be seen that the record player of this invention is provided with a small panel 160 mounted on the topside of the base plate 6 adjacent to the pickup arm 22. Actuator buttons 161, 162, and 163 of electrical switches for controlling or selecting the type of operation of the player project upwardly through the base plate and the panel 160 to be accessible to an operator of the player.

The buttons 162 and 163 form part of a snap switch 164 and provide for starting and stopping of the turntable motor respectively. The button 161 comprises a sequence selector button and is movable from its automatic "both sides" setting shown in full lines in Figure 2 downwardly and laterally in a substantially L-shaped slot 165 in the control panel 160 as well as in the base plate, to also enable the record player to be set for the automatic playing of merely the topsides of a stack of records, or for the playing of records manually. When the button 161 is moved to the junction of the branches of the slot as indicated by the numeral 166 the record player is set for the automatic playing of the topsides of a stack of records held by the dropping mechanism 13; and when the button is moved to the outer extremity of the lateral branch of the slot as seen at 167, the player is set for full manual operation.

As will be apparent from a consideration of the electrical diagram, Figure 27, depression of the start button 162 effects closure of the snap switch 164 to complete the energizing circuit for the turntable motor 10 to thereby effect rotation of the turntable 7 in a clockwise direction as viewed in Figure 2.

The sequence selector button 161 affords an actuator for a snap switch 168, and when in the position shown in Figure 2 at the top of the L-shaped slot, the switch 168 is closed. This switch must be closed for all automatic operation of the record player of this invention, and is caused to be opened only by setting of the sequence selector button 161 in its position indicated at 167 for the playing of records manually upon the turntable.

The start button 162 also serves as a "reject" button, and for this purpose is mechanically interlinked as at 170 with a normally open push button switch 169. The switch 169 is momentarily closed whenever the start reject button 162 is depressed to actuate the snap switch 164 to a closed position and initiate rotation of the turntable by its motor 10.

The switch 169 is connected in parallel with a second switch 172 of the push button type by conductors 173 and 174 joining the contacts of these two switches, and the switch 172 is provided with a medially pivoted actuating lever 175. One end of the lever 175 is joined to the contactor of the switch, and the other end 176 of the lever projects substantially flatwise toward the axis of the master post 21 to be engaged by the pin 96 of the pickup arm as the latter completes the playing of a record either on the turntable or on the peripheries of the wheels 17. Hence, the inward swinging motion of the pickup arm as the stylus thereof is carried into the change grooves near the center of the record effects pivotal motion of the lever 175 in a direction to close the switch 172. A leaf spring 177 anchored to the underside of the base plate bears against the inner end of the lever 175 to normally maintain the switch 172 open.

The parallel connected switches 169 and 172 cooperate with the switch 168 and a double pole double throw switch 179 to effect connection of either one or the other of the main gears 48 and 49 with the drive pinion 51 on the spindle shaft by governing the energization of one or the other of a pair of electromagnetic trips 180 and 181 for the gears 48 and 49 respectively.

Each of the main gears has a toothless portion 183 for terminating rotation of the gears after one complete revolution thereof at the time the toothless portions come opposite the teeth of the drive pinion 51, and a slot 184 opening to the edge of each gear at the toothless portion thereof provides for the reception of a lever 185. The levers 185 are pivotally mounted in their slots to enable them to be swung from inoperative downwardly tilted positions to which they are biased by gravity to substantially horizontal operative positions as shown in Figure 5 with their outer end portions engaging the teeth of the drive pinion to momentarily mesh either one of the gears with the drive pinion. In Figure 5 the tooth lever 185 carried by the gear 49 is shown in its inoperative condition disconnected from the teeth of the drive pinion 51 while the lever carried by the gear 48 is shown swung upwardly on its pivot and into engagement with the teeth of the drive pinion to drivingly connect the same with the gear 48.

It is the function of the electromagnetic trips 180 and 181 to actuate the levers 185 and for this purpose the levers have upstanding legs 186 projecting upwardly out of the slots 184 of the gears and beneath the hooked ends of the armatures 187 of the electromagnetic trips 180 and 181. The trips 180 and 181 also include solenoids 188 and 189 which, when energized, exert a downward pull upon their armatures to effect swinging of the tooth levers 185 into driving engagement with the drive pinion. It will be understood, of course, that the armatures 187 are biased upwardly against the force of gravity acting thereon so as to enable the tooth levers to maintain themselves in their inoperative positions until such time as they are actuated by their electromagnetic trips.

It will be apparent, therefore, that engagement of either of the tooth levers 185 with the teeth of the drive pinion 51 by energization of its electromagnetic trip effects rotation of either the gear 48 or 49 through one complete revolution since the gears come to rest at the time the toothless portions thereon again reach their positions opposite the teeth of the drive pinion.

According to the present arrangement, all of the motions of the wheels, the dropping mechanism, and the pickup arm necessary to automatically initiate playing of the underside of a record are controlled by the gear 48 during one complete revolution of the same to carry the cams thereon as well as the rollers 57 into operative engagement with their associated mechanisms. Similarly, all of the motions of the wheels and the pickup arm necessary for the playing of the topside of a record on the turntable are controlled by the gear 49 during rotation thereof through one complete revolution to carry the cams and rollers thereon into operative engagement with their associated mechanisms.

Stated in another manner, it will be seen that the gear 48 must be rotated through one complete revolution to effect release of a record to be played by the dropping mechanism and to begin the playing of the underside of such released record deposited on and rotated by the wheels; while the gear 49 must be rotated through one complete revolution after completion of the playing of the underside of a record in order to effect transfer of the record to the turntable and to begin the playing of the topside of said record on the turntable. Also after playing of the topside of the record on the turntable, the gear 48 again must be rotated through one complete revolution to cause another record to be released by the dropping mechanism and to begin the playing of the underside of such record while the same is supported on and rotated by the wheels 17.

The selective automatic connection of the main gears with the drive pinion 51 at the proper times is controlled jointly by the switch 172 at the dictation of the pickup arm, and jointly by the double pole double throw snap switch 179 as stated previously.

The snap switch 179 is preferably mounted alongside the wheel post 20 at the underside of the base plate, and its actuator 191 projects laterally outwardly therefrom to lie between and in the path of motion of a pair of circumferentially spaced lugs 192 and 193 formed on a flange fixed to the post 20 to rotate therewith as the wheels swing back and forth between their operative and inoperative positions with respect to the turntable.

In Figure 3 the position of the post 20 indicates that the wheels 17 have been swung outwardly and rolled off the turntable to their inoperative positions, and that the lug 193 on the post 20 has snapped the switch 179 to its position shown in Figure 27 bridging the stationary contacts 194 and 195 of the switch. When the wheels 17 are swung back onto the turntable or the topmost of the records resting thereon, the lug 192 on the post 20 engages the actuator 191 of the switch to carry the contactor of the switch out of engagement with the contacts 194 and 195 and into bridging engagement with the second pair of stationary contacts 196 and 197 of the switch.

Each time the switch 172 is caused to be closed by motion of the pickup arm at the completion of the playing of one side of a record, either underside of topside, one or the other of the electromagnetic trips 180 or 181 will be caused to become energized to initiate rotation of the gear associated therewith. Thus the purpose of the double pole double throw snap switch 179 is to cause the electromagnetic trips to be energized alternately to first cause the underside of a record to be played on the wheels 17 and to thereafter cause the topside of a record to be played upon the turntable.

To effect this purpose it will be noted that one end of the solenoid 188 is connected to the contact 194 of the switch 179 by means of a conductor 200, while one end of the solenoid 189 is connected to the contact 197 of the switch through a conductor 201; and that the parallel connected switches 169 and 172 are connected with both stationary contacts 195 and 196 of the switch 179 through conductors 202 and 203 respectively, joined with a common conductor 204 leading to the conductor 174 of the switches 169 and 172. The opposite ends of the solenoids 188 and 189 are connected by means of a common conductor 205 with one line L1 of a pair of power lines so that energization of either one of the electromagnetic trips may be effected by a circuit leading through the double pole double throw switch 179, one of the parallel connected switches 169 or 172, and the switch 168 to the return line L2 by means of the conductor 173 which leads through the switch 168 in the closed condition of the latter. It is to be understood, of course, that the switch 168 is connected between the return line L2 and the parallel connected switches 169 and 172, as will be apparent from the electrical diagram.

*Operation*

To automatically play both sides of each of a stack of 10″ records, the posts of the dropping mechanism are first turned to their proper positions as is usually indicated upon the topmost blade of the posts. This motion of the posts carries the slide 151 to its position shown in Figure 3 at which the notch 154 of the slide aligns with the pin 155 on the flange 31 of the pulley 32 and assures that the pickup arm will be properly aligned with the first grooves of 10″ records. The records may then be placed upon the leaves of the dropping mechanism.

Due to the condition of the parts shown in Figure 3, it may also be assumed that the pickup arm has been previously manually swung out away from the turntable and that the player has been stopped with the record supporting wheels 17 rolled off the turntable.

To start the automatic playing of both sides of a stack of records thus placed on the blades of the mechanism, it is necessary for the operator to make sure the sequence selector button 161 has been moved to its position shown in full lines in Figure 2. Thereafter, the start reject button 162 is momentarily depressed to effect closure of the snap switch 164 and energization of the turntable motor so that the turntable spins in a clockwise direction as viewed in Figure 2. Such depression of the start reject button also momentarily closes switch 169.

Since the double pole double throw snap switch 179 has its stationary contacts 194 and 195 bridged when the wheels 17 are off the turntable, this switch cooperates with the switch 169 and the switch 168 to effect completion of an energizing circuit through the coil of the electromagnetic trip 180 at the time the start reject button is depressed.

The energization of the electromagnetic trip 180 causes the tooth lever 185 on the gear 48 to be swung into mesh with the teeth of the drive pinion 51 and thereby cause the teeth on the gear 48 to be brought into mesh with the teeth of the drive pinion for rotation of the gear 48 through one complete revolution by the pinion.

Throughout the first 50° of rotation of the gear 48 the cam 77 thereon slides the neutralizing bar 79 endwise away from the master post 21 to cause the leveling cap 73 on the master post to be pulled downwardly by means of the cable 75. This brings the underside of the cap into engagement with the ends of the radial pins 70 and 71 on the rock shaft 35 of the pickup arm to cause the arm to be brought to a neutral position, that is, to a substantially horizontal position intermediate its upwardly and downwardly tilted positions.

After neutralization of the pickup arm and upon rotation of the gear 48 through an arc of approximately 70°, the cam track 147 on the gear 48 becomes effective to slide the rack bar 134 outwardly away from the gear 48 bringing the teeth on this bar into meshing engagement with the teeth of the gear 130 and consequently effecting rotation of the pulley 128 which is drivingly connected with the gear 130 through the friction clutch 131. The pulley 128 is connected with the pulley 32 on the master post by means of the belt 127, and such rotation of the pulley 128 is translated into rotation of the pulley 32 on the master post in a clockwise direction as viewed in Figure 3 to bring the shoulder 124 on this pulley up into engagement with the side of the vertical pin 96 on the tubular arm 34' of the pickup. It will be understood that such rotation of the pulley 32 has not at this particular time effected any motion of the pickup arm since it has been stated previously that the arm was manually moved outwardly away from the turntable prior to starting of the mechanism. Had the arm been in its inward position over the turntable, however, such rotation of pulley 32 would have swung the "neutralized" arm outwardly away from the turntable to its position shown in Figure 2.

The cam track 147 on the gear 48 is so designed as to effect complete retraction of the pickup after rotation of the main gear 48 through an arc of approximately 145°, but shortly before the rotation of the pulley 32 is halted, the rollers 57 on the gear 48 are brought into engagement with the lever arm 56 to rotate the gear 54 and the gear 53 in a direction such as to simultaneously turn all of the wheel posts in a counterclockwise direction (Figure 2).

After the wheels 17 have been brought over the turntable to track thereon with their axes of rotation normal to and intersecting the axis of the spindle 9, the mechanism appears as shown in Figure 6. The cam 115 on the gear 48 next operates to rock the lever 110 outwardly on its pivot 111 for the purpose of rotating the tensioning collar 92 so as to apply tension to the spring 94 connecting therewith and to also effect release of the bottom record of the stack supported by the dropping mechanism and deposit of such record onto the peripheries of the wheels 17. The dropping mechanism may be actuated by means of a link 210 pivotally connected with the lever 110 and connecting with the portions (not shown) of the dropping mechanism which extend beneath the base plate so as to impart rotation to the dropping mechanism in the direction necessary to effect release of the bottom record of the stack.

The outward rocking of the lever 110 by the cam 115 causes the slide bar 104 to be drawn away from the rocking axis of the pickup arm, or to the right as seen in Figure 11, and the engagement of the upstanding leg 102 on the bar with the hooked extremity 100 of the vertically depending pin on the tensioning collar causes the tensioning collar to be rotated in a counterclockwise direction as seen in Figure 11 to tension the spring 94 and to bring the detent parts 95 and 96 into engagement maintaining the collar in its actuated position. Although the tension spring 94 has been stretched by such rotation of the tensioning collar the leveling cap 73 remains in engagement with the outer extremities of both pins 70 and 71 on the rock shaft 35 of the pickup arm to preclude upward tilting of the arm at this time.

The cam 115 is so designed as to allow the lever 110 and the slide bar 104 to return to their normal inoperative positions under the influence of the spring 106 substantially immediately after actuation of the record dropping mechanism and the application of tension to the spring 94.

After about 225° of rotation of the gear 48 the cam track 147 in the gear becomes effective to retract the rack bar 134, and by the rotation thus imparted to the gear 130, the flange 31 on the pulley 32 of the master post is caused to be rotated in a counterclockwise direction as seen in Figure 3 to engage the shoulder 125 on the flange with the vertically depending pin 96 of the pickup arm and to thereby swing the pickup arm inwardly between the turntable and the record supported on and rotated by the wheels 17 but with the pickup arm still in its neutral or nontilted condition.

Since the records being played are of the 10" variety the limit of inward swinging motion of the pickup arm is determined by the engagement of the pin 155 in the bottom of the notch 154 of the selector bar 151, and such engagement positions the stylus on the outer end of the pickup arm in vertical alignment with the peripheral edge portion or first grooves of the record on the wheels 17.

In the event the teeth of the rack 134 have not completely disengaged themselves from the teeth of the pinion 130 at the time the pin 155 bottoms in the notch 154 of the selector bar, the gear 130 may continue to be rotated by the rack bar but the slip clutch 131 interposed between the gear 130 and the pulley 128 allows the gear to be rotated relatively to the pulley until the rack bar is completely disengaged from the teeth of the gear 130.

Referring to Figure 20 it will be seen that the stylus on the pickup arm is brought under the first groove on the underside of a record supported on and rotated by the wheels 17 after rotation of the main gear 48 through an arc of approximately 280°. Also at this point in the cycle of rotation of the gear 48 the cam 77 carried thereby has rotated far enough to allow the leveling bar 79 to return to its original position, and as the leveling bar slides endwise toward the master post under the influence of the spring 85, the tension on the flexible cable 75 is relieved and the spring 76 reacts on the leveling cap 73 to lift the same off of the ends of the radial pins 70 and 71 to thereby permit the tensioning spring 94 to act on the pin 71 and tilt the pickup arm upwardly to bring the stylus of the arm into engagement with the first or lead groove of the underside of the record on the wheels 17.

Such engagement of the stylus with the underside of the record is effected after the main gear 48 has rotated through an arc of approximately 330°, and the gear continues to rotate through the remaining 30° of its cycle and stops automatically at the time the untoothed portion thereof comes opposite the drive pinion 51.

The underside of the record is now being played as seen in Figure 7, and during this time, all of the control instrumentalities remain at rest. It is highly important to note that while the wheels 17 support the record thereon in spaced relationship above the turntable, they also transmit rotation from the turntable to the record in a direction counter to turntable rotation.

The control instrumentalities are again placed in operation at the completion of playing of the underside of the record on the wheels 17 at the time the pickup arm is carried rapidly inwardly toward the axis of the spindle 8 by the change grooves on the record. As the pickup arm approaches the spindle, the vertically depending pin 96 on the arm engages the outer end 176 of the lever 175 to swing the same on its pivot and effect closure of the switch 172.

Since the double pole double throw snap switch 179 has been actuated by motion of the wheels onto the turntable the contactor of the switch will now be in bridging engagement with the stationary contacts 196 and 197 so that closure of the switch 172 by the pickup arm as described completes an energizing circuit through the coil of the electromagnetic trip 181 as will be apparent from the diagram Figure 27.

The tooth lever 185 on the gear 49 is thereby actuated by the armature of the trip and brought into engagement with the teeth of the drive pinion 51 to drivingly connect the gear 49 with the pinion. Almost immediately upon initial rotation of the gear 49 in a clockwise direction as viewed in Figure 3 the leveling bar 79 is caused to be moved endwise away from the master post by the cam 78 to again effect leveling or neutralization of the pickup arm by the action of the leveling cap 73 on the radial pins 70 and 71 of the arm. Referring to Figure 20 it will be seen that neutralization of the pickup arm is completely effected upon rotation of the cam 78 with the main gear 49 through an arc of approximately 50°.

Thereafter outward swinging motion of the pickup arm to retract the same from over the turntable commences, and this is brought about by the cam track 148 after travel of the main gear 49 through an arc of approximately 70°. The cam track 148 then becomes effective to slide the rack bar 135 outwardly of the gear axis and into mesh with the teeth of the gear 130. The rotation imparted to the gear 130 in this manner is transmitted to the pulley 128 through the friction clutch 131, and the pulley 32 on the master post is consequently caused to be rotated in the direction to bring the shoulder 124 thereon into operative engagement with the vertically depending pin 96 of the pickup arm, thus swinging the arm outwardly to its fully retracted position reached after about 140° of rotation of the main gear 49.

At about the time the pickup arm passes over the peripheral edge portion of the turntable and beneath the outer edge of the record on the wheels 17, the wheels are caused to be rolled off the turntable to their inoperative positions to effect the transfer of the record thereon to the turntable for the playing of the topside of such record, and to remove the tension from the pickup arm through engagement of the part 120 on the wheel of the master post with the pin 121 on the tensioning collar 92.

Retraction of the wheels 17 is brought about by the leading roller 62 on the gear 49 after about 120° of rotation of the gear. At this time it will be seen from Figure 3 that the leading roller 62 rides into the slot 65 of the arm 63 (in the construction line position of the arm) on the master post so as to swing the arm and the post as well as the remaining posts 19 and 20 in a clockwise direction as viewed in Figure 2. The leading roller 62, however, rides out of the slot 65 of the arm 63 before the wheels 17 have been fully retracted, see Figure 14, and as the leading roller becomes disengaged from the arm 63 the trailing roller 62 on the gear 49 engages the edge 66 of the arm to complete the motion of the wheels off the turntable. Referring to Figure 20 it will be seen that the wheels 17 reach their inoperative retracted positions at the time the main gear 49 has made approximately one-half a revolution.

The record whose underside has been played has now been transferred to the turntable and it rotates therewith in a clockwise direction as viewed in Figure 2. Shortly after the transfer of the record in this manner, the rack bar 135 is caused to be retracted inwardly of the gear 49 by its cam track 148 to impart rotation to the gear 130 and the pulley 32 on the master post in the direction to engage the shoulder 125 on the pulley with the vertically depending pin 96 of the pickup arm so as to swing the arm inwardly over the turntable and bring the stylus directly above the lead grooves on the topside of the record resting on the turntable, as in Figure 8.

The proper positioning of the pickup arm with respect to the peripheral portion of the record on the turntable is again assured by the engagement of the pin 155 on the pulley 32 with the bottom of the notch 154 of the selector bar 151.

This advancing motion of the pickup arm commences upon rotation of the main gear through slightly more than 220° and is completed upon rotation of the gear through an arc of 280° as will be seen in Figure 20.

Substantially concomitantly with alignment of the pickup arm with the outer edge of the record on the turntable, the arm is allowed to tilt downwardly by gravity to bring its stylus into engagement with the first groove of the record. This is accomplished by rotation of the cam 78 on the gear 49 to bring the low part of the cam opposite the follower 87 on the bar 79 at which time the spring 85 on the leveling bar draws the bar endwise toward the master post to relieve the tension on the cable 75 and thus allow the leveling cap 73 to be lifted by its spring 76. As the leveling cap moves off of the extremities of the radial pins 70 and 71 on the pickup arm, the arm gently descends toward the top of the record on the turntable and its stylus begins the playing of the topside of said record, as seen in Figure 9.

The gear 49 continues its rotation and very shortly thereafter completes its cycle of operation upon the untoothed portion 183 of the gear coming opposite the drive pinion 51.

With the wheels 17 off the turntable, the double pole double throw snap switch 179 is in the position shown in Figure 27 at the time the playing of the topside of the record is completed and the switch 172 is again closed by the inward motion of the pickup arm caused by the change grooves of the record. Hence, upon such closure of the switch 172 the energizing circuit for the electromagnetic trip 180 will again be completed to initiate another cycle of rotation of the main gear 49. During its rotation, the cams on the gear 49 effect neutralization of the pickup arm and then its retraction, movement of the wheels 17 onto the played record on the turntable, actuation of the dropping mechanism to release the second record from the stack for descent onto the peripheries of the wheels 17, tensioning of the pickup arm, advance of the pickup arm to a position beneath the outer edge of the record on the wheels, and the tilting of the pickup arm upwardly to bring its stylus into engagement with the first groove of the record resting on and rotated by the wheels.

In this manner both sides in succession of an entire stack of records placed on the leaves of the dropping mechanism may be played automatically; and since the mechanism will be left in its condition to play the underside of a record after the topside of the last record has been played on the turntable, the absence of a record on the wheels 17 will be readily apparent to the operator and will constitute a signal for the operator to shut off the turntable motor by depression of the stop button 163.

If desired, however, the operator may depress the start reject button 162 prior to pressing the stop button 163 so as to cause the main gear 49 to be carried through another complete cycle of rotation for the retraction of the wheels 17 from the turntable and the engagement of the pickup with the topside of the last played record on the turntable. The operator may then stop the mechanism and manually lift the pickup arm off the topmost record on the turntable to enable the stack of played records to be removed therefrom.

The automatic playing of a stack of 12″ records placed upon the leaves of the dropping mechanism is accomplished in exactly the same manner with the exception that the selector bar 151 is automatically moved to its position limiting rotation of the pulley 132 at a point at which the stylus of the pickup arm aligns with the first grooves of 12″ records; and such actuation of the selector bar 151 is accomplished, as stated previously, by the setting of the dropping mechanism for the reception of the larger records.

*Control mechanism governing one side playing*

Inasmuch as present recording practice requires the sequential playing of first the topsides of a number of records of an album followed by sequential playing of the undersides of the records, the player of this invention is provided with a selecting mechanism indicated generally by the numeral 215 by which one side only of a stack of records may be played in an automatic fashion. This mechanism is best illustrated in Figures 3 and 24 to 27 inclusive, and is located adjacent to the switch 168 at the underside of the base plate and alongside the outer ends of the rack bars 134 and 135.

The selecting mechanism includes a single pole snap switch 216 mounted on a slide 217 constrained for endwise motion toward and from the snap switch 168 and crosswise of the outer ends of the rack bars 134 and 135 so as to enable bodily positioning of the switch 216 in certain predetermined relationships with respect to the outer ends of the rack bars.

Sliding motion is adapted to be imparted to the slide 217 by means of a lever 218 having a pivotal connection as at 219 with the slide bar at the end thereof adjacent to the snap switch 168 and alongside the end of the rack bar 134. The sequence selector button 161 is mounted on the topside of this lever to enable the switch 216 to be manually shifted either forwardly or rearwardly upon sliding of the button in the longitudinal branch of the L-shaped slot 165 of the control panel 169. The lever 218 is also free to pivot on its axis 219 relative to the slide bar during motion of the sequence selector button 161 outwardly in the laterally directed branch of the L-shaped slot 165 to its position indicated by the numeral 167.

For the automatic playing of both sides of records in the manner previously described the switch 216 is positioned by the sequence selector button in more or less neutral relationship to the outer ends of the rack bars 134 and 135. When the selector button is moved to the junction of the branches of the L-shaped slot to its position indicated by the numeral 166 in Figure 2, the slide bar 217 and switch 216 are slid bodily toward the switch 168 to carry a pin 220 on the outer end of the lever 218 between a pair of prongs 221 on the switch 168. These prongs comprise the actuator for the switch 168.

At the same time, the switch 216 is moved closer to the outer end of the rack bar 134 and into a position such that depending pins 222 and 223 on the outer ends of an actuator bar 224 for the switch are brought into the paths of endwise motion of the rack bars 134 and 135 respectively.

During the cycle of rotation of the main gear 48, the pin 222 of the actuator bar 224 is engaged by the rack bar 134 during endwise motion of the bar outwardly of the gear, see Figure 25, and switch 216 is actuated by such engagement to a closed position. Such actuation of the switch 216 carries the pin 223 thereof toward the adjacent end of the rack bar 135 so that during the cycle of rotation of the gear 49, the outward endwise motion of the rack bar 135 engages the pin 223 to effect opening of switch 216.

The contacts of the switch 216 are connected in series with another switch 225 by means of a conductor 226, and the switches 216 and 225 are connected in series with the switch 168 by a conductor 227 and in series with the contacts 196 and 197 of switch 179 by a conductor 228. The conductor 227 also places the switches 216 and 225 in parallel with the parallel connected switches 169 and 172.

It is the purpose of the switches 216 and 225 to initiate rotation of the main gear 49 immediately upon completion of the cycle of rotation of the gear 48 at the time it is desired to play only the topsides of records automatically on the record player of this invention. To achieve this purpose the switch 225 is arranged for actuation by the nearly circular cam disc 55 on the gear 48, and it will be noted that the disc 55 has but a slight depression 230 in its periphery which receives the follower 231 on one of the blades of the switch only in the "at rest" position of the main gear 48. Since the switch 225 is of the normally closed spring blade type the contacts of the switch are closed in the "at rest" position of the gear 48.

A cam arm 232 carried by the base plate is adapted to be engaged by the pin 222 during sliding of the switch rearwardly for its return to an automatic "both side" setting, and the resulting deflection of the pin 222 causes the switch to be opened for the proper operation of the mechanism for "both side" playing. It is to be understood, however, that the switch 216 may in some instances, be in an open position at the time of resetting the player for both side operation, and in this event, the pin 222 of the switch 216 clears the cam arm 232 during the return of the switch to its neutral position relative to the adjacent ends of the rack bars.

*Automatic operation for one side playing*

In order to automatically play only the topside of each of a stack of records, the records are placed upon the leaves of the dropping mechanism in the customary manner, and the sequence control button 161 moved forwardly on the control panel 160 to its position indicated by the numeral 166 at the junction of the branches of the L-shaped slot 165.

Such motion of the sequence control button 161 sets the switch 216 for alternate actuation by the rack bars 134 and 135 during their cam propelled motion outwardly of their respective main gears, as shown in Figures 24, 25 and 26. The start reject button 162 is then depressed to initiate rotation of the turntable, and the momentary closure of switch 169 effects energization of the coil of the electromagnetic trip 180 to initiate the cycle of rotation of the main gear 48.

The switch 225 is caused to open at the start of the cycle of rotation of the gear 48, and this switch remains open during the entire cycle of rotation of the gear 48. The switch 216, however, will be closed by the rack bar 134 at the time the cam track 147 on gear 48 propels the rack bar outwardly away from the main gear 48 to effect retraction of the pickup arm. It is understood, of course, that the pickup arm first has been "neutralized" by the action of the cam 77 on bar 79 and leveling cap 73.

As brought out in detail previously, the wheels 17 are next brought onto the turntable by the action of the rollers 57 on the lever arm 56, and a record will be released by the dropping mechanism and deposited upon the periphery of the wheels as a result of the action of the cam 115 on the lever 110. Actuation of lever 110 also effects rotation of the tensioning collar 92 in the direction to tension the spring 94, to cause upward tilting of the pickup arm upon subsequent release of the leveling cap 73.

The pickup arm is next brought inwardly over the turntable and released for upward tilting motion toward the underside of the record on the wheels. Before playing of the underside of the record can commence, however, the gear 48 will have completed its cycle of rotation and will come to rest with the cam follower 231 of the switch 225 engaged in the depression 230 of the cam disc 55 causing the switch 225 to close. Immediately upon closure of the switch 225 in this manner, the electromagnetic trip 181 is caused to be energized and the cycle of rotation for the main gear 49 started.

The energizing circuit for the coil 189 of the trip 181 leads from line L2 and conductor 173 serially through the switches 168, 216, and 225, across the then bridged contacts 196 and 197 of the switch 179, and is completed through the coil 189 to line L1 through the conductors 201 and 205.

Hence, since the main gear 49 starts its cycle of rotation immediately upon completion of the cycle of rotation of the gear 48, the pickup arm will be "leveled" or "neutralized" before it has had a chance to begin playing of the underside of the record on the wheels, and the arm will be retracted, along with the wheels, to effect the transfer of the record resting thereon to the turntable. The topside of the record thus transferred is thereafter caused to be played in the same manner as previously described for "both sides" playing.

After the topside of the record has been played on the turntable the pickup arm effects closure of the switch 172 and consequently energization of the coil of the electromagnetic trip 180, thereby initiating another cycle of rotation of the main gear 48 governing the playing of the underside of records on the wheels; but as described previously the cycle of rotation of the main gear 49 again will be commenced immediately upon completion of the cycle of rotation of the gear 48 so that the second record deposited on the wheels 17 will not be played but will be quickly transferred to the turntable for the playing of its topside in the aforementioned manner.

*Manual playing of records*

For the playing of the topsides of records manually upon the turntable, the sequence selector button 161 is shifted out to the outer extremity of the lateral branch of the L-shaped slot to the position indicated by the numeral 167 to effect opening of the switch 168 by the pin 220 on the lever 218. Since the electromagnetic trips 180 and 181 are rendered inoperative by opening of the switch 168, the main gears 48 and 49 cannot be set into operation by closure of the switch 172 as was the case heretofore during the automatic playing of records, and the changing of records and the positioning of the pickup arm must be accomplished manually.

It is also necessary to move the wheels 17 to their retracted positions off the turntable to enable records to be played manually.

*Manual playing of both sides of records*

The modification illustrated in Figure 28 more or less diagrammatically indicates how the principles of this invention may be readily employed for the manual playing of both sides of a record. The modified player here shown comprises a base plate 6' having a stationary spindle 8' projecting upwardly therefrom, and likewise includes a series of three equispaced rubber tired wheels 17' which cooperate with the spindle 8' to support and rotate a record disc placed thereon with both sides of the record accessible for playing. These wheels, however, are mounted for rotation on fixed horizontal axes, their axes being normal to and intersecting the axis of the spindle 8' at a common point.

The wheels 17' may be spaced slightly above the base plate, and since there is no turntable in this embodiment of the invention, the spindle of one of the wheels is provided with a pulley by which it may be belt driven from a reversing motor 10' mounted beneath the base plate.

Mounted on the base plate alongside one of the wheels is an upright bearing 233 to freely rotatably and slidingly receive a vertical shaft 234. The pickup arm 22' is fixed to the upper end of the shaft 234 and is adapted to be lifted up bodily, along with its shaft 234, for manual positioning of that end of the stylus projecting from the underside of the arm with the topside of a record supported on and rotated by the wheels 17'. In this position of the arm the weight of the arm and its shaft provide sufficient bias for the proper playing of the topside of the record.

For the playing of the underside of a record on the wheels, the arm 22' is manually lifted off the topside of the record and depressed to a lower level at which that end of the stylus projecting from the topside of the arm may be engaged with the underside of a record on the wheels. The depression of the arm, however, is yieldingly resisted by a spring 239 acting on the shaft 234 and this spring provides the necessary upward bias on the arm for the proper playing of the underside of the record. It is important, however, that the force of the spring acting on the pickup arm be insufficient to lift the record off the wheels or to otherwise interfere with the frictional driving connection between the record and the peripheries of the wheels.

As stated, the motor 10' is of the reversing type, and a double pole double throw reversing switch 240 is provided to control the direction of rotation of the armature of the motor. This switch is preferably mounted on the underside of the base plate near the shaft 234 and comprises a pair of relatively stationary contacts 235 and 236, and a movable contactor 237 cooperable with either one or the other of the stationary contacts. The movable contactor 237 of the switch is biased into engagement with one of the stationary contacts 235 for rotation of the motor 10' in the proper direction to produce counterclockwise rotation of the record R during the playing of the underside of the record. An actuator 238 on the shaft 234 for the pickup arm is adapted to engage the contactor 237 when the pickup arm is lifted upwardly to play the topside of a record on the wheels to effect separation of the contactor 237 from the stationary contact 235 and the engagement of the stationary contact 236 by the contactor.

Hence, it will be apparent that the switch 240 is actuated to control the direction of rotation of the record on the wheels 17' in accordance with the elevational adjustment of the pickup arm 22'.

A more or less conventional on and off switch 241 is provided for starting and stopping the motor 10', and this switch has its actuator accessible at the top of the base plate for manual actuation.

From the foregoing description taken in connection with the accompanying drawings, it will be readily apparent to those skilled in the art that this invention provides for the playing of both sides of disc phonograph records in an unusually simple but highly efficient manner.

What I claim as my invention is:

In a record playing device: a horizontal turntable; a number of upright rotatable posts mounted for up and down motion in juxtaposition to the turntable and connected with one another to rotate in unison about their axes; a wheel mounted on each post to move bodily therewith and rotatable on a horizontal axis, whereby the wheels are movable bodily in unison toward and from the turntable axis from operative positions tracking on the turntable with their axes normal to the turntable axis, to inoperative positions away from the turntable axis and off of the turntable, said wheels being adapted to support a record on their peripheries in spaced superimposed relationship to the turntable and to rotate said record by frictional contact of the peripheries of the wheels with the turntable or a record thereon and the underside of the record supported on the wheels; mechanism connected with certain of said posts for swinging said wheels bodily and in unison toward and from the turntable axis so as to effect transfer of a record from the wheels to the turntable during motion of the wheels to their inoperative positions; and means supporting said wheels at successively higher levels in consequence of such transfer of a number of records from the wheels to the turntable, said last named means comprising comb structures mounted adjacent to the posts and having substantially vertically equispaced teeth providing a series of substantially horizontal supporting ledges, and blades fixed to the posts and movable into spaces between adjacent teeth on the adjacent comb structures in consequence of rotation of the posts in directions to carry the wheels away from the turntable axis.

FRANZ L. BIDINGER.

References Cited in the file of this patent

UNITED STATES PATENTS

| Number | Name | Date |
|---|---|---|
| 1,547,768 | Little | July 28, 1925 |
| 1,841,593 | Benjamin | Jan. 19, 1932 |
| 2,318,654 | Wissner | May 11, 1943 |
| 2,515,283 | Wissner | July 18, 1950 |
| 2,555,895 | Lynch | June 5, 1951 |
| 2,557,015 | Slater | June 12, 1951 |

FOREIGN PATENTS

| Number | Country | Date |
|---|---|---|
| 541,156 | Great Britain | Nov. 14, 1941 |
| 111,950 | Sweden | Sept. 26, 1944 |